(12) United States Patent
Bear et al.

(10) Patent No.: US 8,700,674 B2
(45) Date of Patent: Apr. 15, 2014

(54) DATABASE STORAGE ARCHITECTURE

(75) Inventors: Chuck Bear, Hudson, MA (US); Rajat Venkatesh, Malden, MA (US); Benjamin Vandiver, Arlington, MA (US); Sreenath Bodagala, North Andover, MA (US); Shilpa Lawande, Littleton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 745 days.

(21) Appl. No.: 12/502,890

(22) Filed: Jul. 14, 2009

(65) Prior Publication Data

US 2011/0016157 A1  Jan. 20, 2011

(51) Int. Cl.
*G06F 17/30* (2006.01)
*G06F 15/16* (2006.01)

(52) U.S. Cl.
USPC .......................................................... 707/802

(58) Field of Classification Search
USPC .......................................................... 707/804
See application file for complete search history.

(56) References Cited

U.S. PATENT DOCUMENTS

| | | | |
|---|---|---|---|
| 5,345,585 A | 9/1994 | Iyer et al. | |
| 5,423,037 A | 6/1995 | Hvasshovd | |
| 5,794,228 A | 8/1998 | French et al. | |
| 5,794,229 A | 8/1998 | French et al. | |
| 5,878,409 A | 3/1999 | Baru et al. | |
| 5,918,225 A | 6/1999 | White et al. | |
| 5,960,423 A | 9/1999 | Chaudhuri et al. | |
| 6,009,432 A | 12/1999 | Tarin | |
| 6,029,163 A | 2/2000 | Ziauddin | |
| 6,105,020 A | 8/2000 | Lindsay et al. | |
| 6,421,687 B1 | 7/2002 | Klostermann | |
| 6,745,311 B2* | 6/2004 | Fabrizio et al. | 711/172 |
| 6,801,903 B2 | 10/2004 | Brown et al. | |
| 6,879,984 B2 | 4/2005 | Duddleson et al. | |
| 7,024,414 B2 | 4/2006 | Sah et al. | |
| 7,139,783 B2 | 11/2006 | Hinshaw et al. | |
| 7,464,247 B2 | 12/2008 | Uppala | |
| 7,483,918 B2 | 1/2009 | Chaudhuri et al. | |
| 2004/0260684 A1 | 12/2004 | Agrawal et al. | |
| 2005/0065939 A1 | 3/2005 | Miao | |
| 2005/0187977 A1 | 8/2005 | Frost | |
| 2005/0203940 A1 | 9/2005 | Farrar et al. | |
| 2005/0283658 A1 | 12/2005 | Clark et al. | |
| 2006/0085375 A1* | 4/2006 | Egan et al. | 707/1 |

(Continued)

FOREIGN PATENT DOCUMENTS

WO    2008016877    2/2008

OTHER PUBLICATIONS

Stavros, Harizopoulos, et al., "Performance Tradeoffs in Read-Optimized Databases"., Proceedings of the International Conference on Very Large Data Bases., VLDB Conference, Rome, Italy, Sep. 11-14, 2001., Morgan Kaufman, Orlando, FLA., Sep. 12, 2006., pp. 487-496.

(Continued)

*Primary Examiner* — Alex Gofman

(57) ABSTRACT

Methods, systems and program products for database storage. In one implementation, data of a projection of a database is stored at least partly in grouped ROS format and partly in column format based on patterns of updating the projection data. The projection data is updated so that the updated projection is stored partly in grouped ROS format and partly in column format.

25 Claims, 16 Drawing Sheets

(56) References Cited

U.S. PATENT DOCUMENTS

| | | | |
|---|---|---|---|
| 2006/0085484 A1 | 4/2006 | Raizman et al. | |
| 2006/0184338 A1 | 8/2006 | Lightstone et al. | |
| 2006/0253473 A1 | 11/2006 | Agrawal et al. | |
| 2006/0259728 A1 | 11/2006 | Chandrasekaran et al. | |
| 2006/0282423 A1 | 12/2006 | Al-Omari et al. | |
| 2007/0027904 A1 | 2/2007 | Chow et al. | |
| 2007/0067261 A1 | 3/2007 | Burger et al. | |
| 2008/0027905 A1* | 1/2008 | Jensen et al. | 707/2 |
| 2008/0033914 A1 | 2/2008 | Cherniack et al. | |
| 2008/0040348 A1* | 2/2008 | Lawande et al. | 707/7 |
| 2008/0059492 A1* | 3/2008 | Tarin | 707/100 |
| 2008/0281784 A1 | 11/2008 | Zane et al. | |

OTHER PUBLICATIONS

Vertica Systems Inc., "The Vertica Analytic Overview White Paper", [Online] Nov. 2008, pp. 1-13, Retrieved from the Internet: URL:http://www.acctiva.co.uk/userfiles/file/VerticaArchitectureWhitePaper.pdf [retrieved on Sep. 19, 2010].

Communication Relating to the Results of the Partial International Search for PCT Application No. PCT/US2010/041898, dated Oct. 13, 2010, 8 pages.

Ailamaki et al., "Weaving Relations for Cache Performance," Proceedings of the 27$^{th}$ VLDB Conference, Roma, Way, 2001, 12 pages.

Apache Cassandra "Data Model" [online], [retrieved on May 29, 2009]. Retrieved from the Internet <URL: http://cwiki.apache.org/confluence/display/CSDR/Pata+Model >, 2 pages.

Cohen et al., MAD Skills: New Analysis Practices for Big Data [online], [retrieved May 29, 2009]. Retrieved from the Internet <URL: http://db.cs.berkeley.edu/papers/vldb09-madskills.pdf>, 12 pages.

DBMS2—The secret sauce to Clearpace's compression [online], [retrieved May 29, 2009]. Retrieved from the Internet <URL: http://www.dbms2.com/2009/05/14/the-secret-sauce-to-clearpaces-compression/>, 6 pages.

Greenplum—Greenplum Database 3.3—Features [online], [retrieved Jul. 13, 2009]. Retrieved from the Internet <URL: http://www.greenplum.com/products/features/>, 6 pages.

Schaffner et al., "A Hybrid Row-Column OLTP Database Architecture for Operational Reporting" [online], [retrieved on May 29, 2009]. Retrieved from the Internet <URL: http://www.vldb.org/conf/2008/workshops/WProc_BIRTE/p7-schaffner.pdf>, 14 pages.

Schemas Modeling Techniques, Oracle Database Data Warehousing Guide, 2001, 24 pages.

Schemas, Oracle8i Data Warehousing Guide, 1999, 8 pages.

Stonebraker et al., "C-Store: a Column-Oriented DBMS," *Proc. 31$^{st}$ VLDB Conference*, Trodheim, Norway, 2005, 12 pages.

Tian-Lei et al., "Automatic Relational Database Compression Scheme Design Based on Swarm Evolution," *Journal of Zhejiang University*, published Apr. 5, 2006, pp. 1642-1651.

Zilio et al., DB2 Design Advisor; Integrated Automatic Physical Database Design, Proc. 30$^{th}$ VLDB Conference, Toronto, Canada, Sep. 2004, p. 1087-1097.

Abadi et al., "Materialization Strategies in a Column-Oriented DBMS," *Proceedings of ICDE*, 2007, Istanbul, Turkey, 10 pages.

Abadi, Daniel, "Redefining Physical Data Independence," *Proceedings of CIDR*, Jan. 2007, 6 pages.

"ADABAS-RAPID Demonstration Databases," Statistics Canada, Demonstration Databases, Jun. 1978, 38 pages.

Agrawal et al., "Automated Selection of Materialized Views and Indexes for SQL Databases," *Proceedings of the 26$^{th}$ International Conference on Very Large Databases*, Cairo, Egypt, 2000, pp. 496-505.

Agrawal et al., "Integrating Vertical and Horizontal Partitioning into Automated Physical Database Design," *SIGMOD*, Jun. 13, 2004, 12 pages.

Alsberg, Peter A. ,"Space and Time Savings Through Large Data Base Compression and Dynamic Restructuring," Proceedings of the IEEE vol. 63, No. 8, Aug. 1975, 9 pages.

"An Introduction to Multidimensional Database Technology," Kenan Systems Corporation, 1993-1995, 29 pages.

Andersson, "A Study of Modified Interpolation Search in Compressed, Fully Transposed, Ordered Files," Proceedings of the 4$^{th}$ International Conference on Statistical and Scientific Database Management, 1988, 13 pages.

Baker, Margaret, "User's Guide to the Berkeley Transposed File Statistical System," Survey Research Center Technical Report No. One, Jan. 1974, 132 pages.

Baralis et al., "Materialized View Selection in a Multidimensional Database," in *Proceedings of the 23$^{rd}$ VLDB Conference*, Athens, Greece, 1997, pp. 156-165.

Batory, D. S., "On Searching Transposed Files," ACM Transactions on Database Systems, vol. 4, No. 4, Dec. 1979, 14 pages.

Bleier et al., "File Organization in the SDC Time-Shared Data Management System (TSMS)," North-Holland Publishing Company, 1969, 8 pages.

Boral et al., "Prototyping Bubba, A Highly Parallel Database System," IEEE Trans. on Knowledge and Data Engineering, Mar. 1990, 21 pages.

Brun et al., "Visualization of Scientific Data for High Energy Physics. PAW++, KUIP, PIAF: General-Purpose Portable Software Tools for Data Analysis and Presentation," European Organization for Nuclear Research, 1993, 12 pages.

Burnett et al., "Data Management Support for Statistical Data Editing and Subset Selection," Proceedings of the 1$^{st}$ LBL Workshop on Statistical Database Management, 1981, 15 pages.

Chaudhuri et al., "An Efficient Cost-Driven Index Selection Tool for Microsoft SQL Server," Proceedings of the 23$^{rd}$ VLDB Conference Athens, Greece, 1997, pp. 146-155.

Cochinwala et al., "A Multidatabase System for Tracking and Retrieval of Financial Data," Proceedings of the 20$^{th}$ VLDB Conference Santiago, Chile, 1994, 8 pages.

Cornell, "A Vertical Partitioning for Relational Databases," IBM Thomas J. Watson Research Center, 1987, 8 pages.

Cornell et al., "An Effective Approach to Vertical Partitioning for Physical Design of Relational Databases," IEEE Transactions on Software Engineering, vol. 16, No. 2, Feb. 1990, 11 pages.

Cressman, "Analysis of Data Compression in the DLT2000 Tape Drive," Digital Technical Journal vol. 6, No. 2, 1994, 17 pages.

Date, C. J., "An Introduction to Database Systems, vol. 1," Addison-Wesley Publishing Company, 1990, 400 pages.

Elmasri et al., "Fundamentals of Database Systems." The Benjamin/Cummings Publishing Company, Inc., 1989.

Farsi et al., "A Relational Database for Efficient Processing of Statistical Queries," Proceedings of the Second International Workshop on Statistical Database Management, 1983, 9 pages.

Galindo-Legaria, Cesar A. et al. "Outerjoin Simplification and Reordering for Query Optimization," ACM Trans. Database Syst. 22(1) pp. 43-73 (1997).

Goil et al., "Sparse Data Storage of Multi-Dimensional Data for OLAP and Data Mining," Department of Electrical & Computer Engineering Center for Parallel and Distributed Computing, 1994, 26 pages.

Goldstein, Andrew C. "Files-11 On-Disk Structure Specification," Digital Equipment Corporation, Jan. 15, 1979, 104 pages.

Gupta et al., "Selection of Views to Materialize under a Maintenance-Time Constraint," International Conference on Database Theory (ICDT), 1999, 453-470.

Hammer et al., "A Heuristic Approach to Attribute Partitioning," Laboratory for Computer Science, 1979, 9 pages.

Hawthorn, Paula, "Microprocessor Assisted Tuple Access, Decompression and Assembly for Statistical Database Systems," Proceedings of the 8$^{th}$ VLDB, 1982, pp. 223-233.

"IBM Universal Database for Linux, Unix, and Windows," Product Manual, Version 7, 68 pages, http://www-306.ibm.com/software/data/db2/udb/support/manualsv7.html.

"IBM Universal Database for Linux, Unix, and Windows," Product Manual, Version 7.2, 94 pages, http://www-306.ibm.com/software/data/db2/udb/support/manualsv7.html.

Inmon et al., "The Dynamics of Data Base," Prentice Hall, 1986.

(56) References Cited

OTHER PUBLICATIONS

Ioannidis et al., "Left-Deep vs. Bushy Trees: An Analysis of Strategy Space and ITS Implications for Query Optimization," Computer Sciences Department, University of Wisconsin, Madison, WI, 1991, pp. 168-177.
Khoshafian et al., "Efficient Support of Statistical Operations," IEEE Trans. on Software Engineering, vol. SE-11, No. 10, Oct. 1985, 13 pages.
Khoshafian et al., "A Query Processing Strategy for the Decomposed Storage Model," Microelectronics and Computer Technology Corporation, 1987, pp. 636-643.
Kickfire "The First Analytic Appliance for the Mass Market, Blog comment," [online], (retrieved on Aug. 6, 2009). Retrieved from the Internet: <URL: http://www.kickfire.com/blog/?p-392>, 4 pages.
Korth et al., "Database System Concepts," Second Edition, McGraw-Hill, Inc., 1991.
March, "On the Selection of Efficient Record Segmentations and Backup Strategies for Large Shared Databases," ACM Transactions on Database Systems, vol. 9, No. 3, Sep. 1984, 30 pages.
McCarthy, J. L., "Enhancements to the Codata Data Definition Language," Feb. 1982.
McKusick et al., "A Fast File system for UNIX," Computer ACM Transactions on Computer Systems 2, 3 (Aug. 1984), pp. 181-197.
Muthuraj et al., "A Formal Approach to the Vertical Partitioning Problem in Distributed Database Design," CIS Department University of Florida and College of Computing Georgia, a Technical paper, 1992, 24 pages.
Naeker, Philip A. H. "Real-World Interoperability", Part 4, RDBMS Maturity, vol. 10, No. 12, Nov. 1991, 8 pages.
Navathe et al., "Vertical Partitioning Algorithms for Database Design," ACM Transactions on Database Systems, vol. 9, No. 4, Dec. 1984, 31 pages.
Navathe, et al., "Vertical Partitioning for Database Design: A Graphical Algorithm," Database Systems Research and Development Center, 1989, 11 pages.
O'Neil, Patrick E., "Model 204 Architecture and Performance," Presented at $2^{nd}$ International Workshop on High Performance Transaction Systems, Sep. 1987, 21 pages.
Ono et al., "Measuring the Complexity of Join Enumeration in Query Optimization," *Proceedings of the 16th VLDB Conference*, Brisbane, Australia, Aug. 13-16, 1990), pp. 314-325.
Papadomanolakis et al., "AutoPart: Automating Schema Design for Large Scientific Databases Using Data Partitioning," *Proc. 16th International Conference on Scientific and Statistical Database Management* (SSDBM 2004), Santorini Island, Greece, Jun. 2004, 10 pages.
Pellenkoft et al., "The Complexity of Transformation-Based Join Enumeration," *Proceedings of the $23^{rd}$ VLDB Conference*, Athens, Greece, 1997, pp. 306-315.
Pirahesh, Hamid et al. "Extensible/Rule Based Query Rewrite Optimization in Starburst," IBM Almaden Research Center, San Jose, CA, pp. 39-48.
"RAPID Database Creation," Statistics Canada, 1978, 76 pages.
"RAPID Database Retrieval Manual," Statistics Canada, 1978, 46 pages.
"RAPID DBMS Manual," Statistics Canada, 1978, 16 pages.
"RAPID File Design Manual," Statistics Canada, 1978, 56 pages.
"RAPID Language Reference," Statistics Canada, 1978, 134 pages.
"RAPID Programmers Guide," Statistics Canada, 1978, 100 pages.
Richardson, "Supporting Lists in a Data Model (A Timely Approach)," Proceedings of the $18^{th}$ VLDB Conference Vancouver, British Columbia, Canada, 1992, 12 pages.
"Sadas Brochure," Advanced Systems s.r.l., 5 pages.
"Sadas QA," Advanced Systems s.r.l., 2 pages.
Schek, Hans-Joerg, "Information Retrieval with APL by Adaptive Index and User Guidance," Information Retrieval with APL, 1980, 8 pages.
Selinger et al., "Access Path Selection in a Relational Database Management System," IBM's System R Optimizer, *Proceedings of the ACM SIGMOD Conference on the Management of Data*, Boston, MA, May 1979), pp. 23-34.
Seshadri et al., "Sequence Query Processing," SIGMOD 94, ACM, pp. 430-441.
Shasha, Dennis E. "Database Tuning," Prentice Hall PTR, 1992.
Shoshani et al., "Statistical Databases: Characteristics, Problems, and Some Solutions," Proceedings of the Eighth International Conference on Very Large Data Bases, Sep. 1982, 12 pages.
Stonebraker, Michael, Readings in Database Systems, Second Edition, Morgan Kaufmann, 1994.
Tanaka, "A Data-stream Database Machine with Large Capacity," Advanced Database Machine Architecture, 1983, 37 pages.
Tao et al., "Optimizing Large Star-Schema Queries with Snowflakes via Heuristic-Based Query Rewriting," IBM Canada Ltd., 2003, pp. 1-15.
Thomas et al., "ALDS Project: Motivation, Statistical Database Management Issues, Perspectives, and Directions," Proceedings of the $2^{nd}$ International Workshop on Statistical Database Management, 1983, 7 pages.
Tsuda et al., "Transposition of Large Tabular Data Structures with Applications to Physical Database Organization—Part I. Transposition of Tabular Data Structures and Part II. Applications to Physical Database Organization," ACTA Information, vol. 19, 1983, 41 pages.
Turner et al., "A DBMS for Large Statistical Databases," Statistics Canada, 1979, pp. 319-327.
Uno, Takeaki "An Algorithm for Enumerating all Directed Spanning Trees in a Directed Graph," In Proceedings of the 7th International Symposium on Algorithms and Computation, Lecture Notes in Computer Science; vol. 1178, 1996, pp. 166-173.
Valentin et al., "DB2 Advisor: An Optimizer Smart Enough to Recommend Its own Indexes," *Proc. ICDE Conf.*, 2000, pp. 101-110.
Vance et al., "Rapid Bush Join-Order Optimization with Cartesian Products," *Proceedings of the 1996 ACM SIGMOD International Conference on Management of Data*, Montreal, Quebec, Canada, Jun. 4-6, 1996), pp. 35-46.
Weeks et al., "Flexible Techniques for Storage and Analysis of Large Continuous Surveys," Proceedings of the First LBL Workshop on Statistical Database Management, Mar. 1982.
Wong et al., "Bit Transposed Files," Proceedings of VLDB 85, Stockholm, 1985, 10 pages.
Wiederhold, Gio, "Database Design," McGraw-Hill Book Company, 1983.
International Search Report and Written Opinion for PCT Application No. PCT/US07/74740, dated Jul. 3, 2008, 19 pages.
International Search Report and Written Opinion for PCT Application No. PCT/US07/74741, dated Jul. 24, 2008, 10 pages.
International Preliminary Report on Patentability for PCT Application No. PCT/US07/74740, dated Feb. 12, 2009, 16 pages.
International Preliminary Report on Patentability for PCT Application No. PCT/US07/74741, dated Feb. 12, 2009, 5 pages.
International Search Report and Written Opinion for PCT Application No. PCT/US2010/023216, dated Aug. 3, 2010, 16 pages.
Supplementary European Search Report for EP Application No. EP 07799914, dated May 28, 2010, 4 pages.
Steinbrunn et al., "Heuristic and Randomized Optimization for the Join Ordering Problem," VLDB Journal, Spring Verlag, Berlin, DE LINKD—DOI: 10.1007/500778005040, vol. 6, No. 3, Aug. 1, 1997, pp. 191-208, XP000957755, ISSN: 1066-8888, 18 pages.
Son J.H. et al.: "An Adaptable Vertical Partitioning Method in Distributed Systems", Journal of Systems and Software, Elsevier North Holland, New York, NY, US LNKD—DOI: 10.1016/J.JSS.2003.04. 002, vol. 73, No. 3, Nov. 1, 2004, pp. 551-561, XP004560798 ISSN: 0164-1212, 11 pages.
Abadi et al., "Column-Stores vs. Row-Stores: How Different Are They Really?" SIGMOD '08, Jun. 9-12, 2008, Vancouver, British Columbia, 14 pages.
Abadi, Daniel, "A Tour Through Hybrid Column/row-Oriented DBMS Schemes," [online], [retrieved Sep. 9, 2009]. Retrieved from Internet: <URL: http://dbmsmusings.blogspot.com/2009/09/tour-through-hybrid-columnrow-oriented.html>, 10 pages.

(56) References Cited

OTHER PUBLICATIONS

Abadi, Daniel, "Watch Out for VectorWise," [online], [retrieved Sep. 9, 2009]. Retrieved from Internet: <URL: http://dbmsmusings.blogspot.com/2009/07/watch-out-for-vectorwise.html>, 9 pages.

Boncz et al., "MonetDB/X100: Hyper-Pipelining Query Execution," Proceedings of the 2005 CIDR Conference, 13 pages.

Cudre-Mauroux et al., "The Case for RodentStore, an Adaptive, Declarative Storage System," 4$^{th}$ Biennial Conference on Innovative Data Systems Research (CIDR), Jan. 4-7, 2009, Asilomar, California, 7 pages.

DBMS2—"Pax Analytica? Row- and Column-Stores Begin to Come Together," [online], (retrieved o Sep. 9, 2009]. Retrieved from Internet: <URL: http://www.dbms2.com/2009/08/04/pax-analytica-row-and-column-stores-begin-to-come-together/>, 7 pages.

Hankins et al., "Data Morphing: An Adaptive, Cache-Conscious Storage Technique," Proceedings of the 29$^{th}$ VLDB Conference, Berlin, Germany, 2003, 12 pages.

Howard, Philip, "The optimal warehouse," [online], (retrieved on Sep. 9, 2009]. Retrieved from Internet: <URL: http://www.it-director.com/technology/data_magmt/content.php?cid-11453 >, 2 pages.

Shao et al., "Clotho: Decoupling Memory Page Layout from Storage Organization," Carnegie Mellon University, Proceedings of the 30$^{th}$ VLDB Conference, Toronto, Canada, 2004, 12 pages.

Townsend et al., "Lowering Your IT Costs with Oracle Database 11g Release 2," An Oracle Corporation White Paper, Sep. 2009, 23 pages.

Zhou et al., A Multi-resolution Block Storage Model for Database Design, Proceedings of the Seventh International Database Engineering and Applications Symposium (IDEAS '03), 4 pages.

Zukowski et al., DSM vs. NSM : CPU Performance Tradeoffs in Block-Oriented Query Processing, Proceedings of the Fourth International Workshop on Data Management on New Hardware, Jun. 13, 2008, Vancouver, Canada, 8 pages.

International Search Report and Written Opinion for PCT Application No. PCT/US2010/041898, dated Mar. 8, 2011, 20 pages.

\* cited by examiner ns of a database table. A logical database design usually
DATABASE STORAGE ARCHITECTURE

BACKGROUND

The present disclosure relates to a database storage architecture.

FIG. 1 illustrates row-store and column-store representations of a database table. A logical database design usually comprises one or more conceptual tables such as FIG. 1's table 120. A table is characterized by a set of attributes, usually depicted as column headings, for which each record in the table has respective (albeit potentially empty) values. In table 120, for instance, the attributes are Emp# (employee number), Dept (department), Room, Phone, and Age. In row-store arrangements values of a given record's successive attributes are typically stored physically adjacent to one another, as FIG. 1's depiction of row-store 122 suggests. In a column-store, as column-store 124 depicts, successive storage locations are occupied by different records' values of the same attribute.

A physical database design choice for both row-stores and column-stores can be the order in which rows or columns are stored. For example, FIG. 1's table 120 may be ordered in a row-store on attribute Room, in which case the first row in the table (Room=101) would be followed by the third row (Room=105) followed by the second row (Room=203). The choice of sort order can influence both query and update performance. For example, if table 120 is physically sorted on Room, then queries that include predicates on Room can be evaluated typically without scanning the entire table.

SUMMARY

In general, one aspect of the subject matter described in this specification can be embodied in a method that includes storing data of a projection of a database at least partly in grouped ROS format and partly in column format based on patterns of updating the projection data; and updating the projection data so that the updated projection is stored partly in grouped ROS format and partly in column format. Other embodiments of this aspect include corresponding systems, apparatus, and computer program products.

These and other aspects can optionally include one or more of the following features. Updating can further comprise storing rows of data for columns of the projection persistently. A time when the rows are stored can be based on at least one of an age of the rows or an aggregate size of the rows. Updating can further comprise storing rows of data for columns of the projection in a write-optimized store. Updating can further comprise estimating a storage size of rows of projection data to be stored based on a size of previously stored projection rows; and storing the rows in grouped ROS format or in column format based on the estimated storage size. The projection data that is stored in grouped ROS format can comprise one or more rows of a first set of the projection's columns. Each row's first columns can be stored together in a single file with at least one other row's first columns. The projection data that is stored in column format can comprise one or more rows for one or more first columns of the projection. Each row's first columns can be stored in separate files and each separate file stores the same first column from more than one row. Updating can further comprise storing rows of projection data for columns in grouped ROS format based on a frequency of use of the columns of the rows. Updating can be performed in response to a request to write data to the projection. Updating can be performed in response to processing a database operator to write data to storage.

In general, another aspect of the subject matter described in this specification can be embodied in a method that includes selecting at least two different storage formats for data of a database projection based on patterns of updating data of the projection; and updating projection data based on the patterns using the selected storage formats. Other embodiments of this aspect include corresponding systems, apparatus, and computer program products.

These and other aspects can optionally include one or more of the following features. The storage formats can comprise at least two of a grouped ROS storage format, a column storage format, and a write-optimized storage format. Updating can further comprise storing rows of the projection data of columns of the projection persistently. The rows are stored at a time based on at least one of an age of the rows or an aggregate size of the rows. Updating can further comprise storing rows of the projection data for columns of the projection in a write-optimized store. Updating can further comprise estimating a storage size of rows of the updated projection data based on a size of previously stored projection rows; and storing the rows of the updated projection data in grouped ROS format or in column format based on the estimated storage size. The updated projection data can be stored in grouped ROS format and wherein the updated projection data comprises one or more rows for a first plurality of the projection's columns. Each row's first columns can be stored together in a single file with at least one other row's first columns. The updated projection data can be stored in column format and wherein the updated projection data comprises one or more rows for one or more first columns of the projection. Each row's first columns can be stored in separate files and each separate file stores the same first column from more than one row. Updating can further comprise storing rows of the projection data in grouped ROS format based on frequency of use of columns of the rows. Updating can be performed in response to processing a database operator to write data to storage.

In general, another aspect of the subject matter described in this specification can be embodied in a method that a computer readable medium storing a projection of a table of a database system, the projection comprising columns of data of the table, the projection comprising: first rows for at least two of the columns in grouped ROS format, each of the first row's columns being stored in a single file with the columns of at least one other first row; and distinct second rows for at least two of the columns in column format, each of the second row's columns being stored in separate files and each separate file storing the same column of more than one of the second rows.

In general, another aspect of the subject matter described in this specification can be embodied in a method that includes associating at least two columns of a projection of a database system with respective storage locations, the method comprising ranking storage locations according to their respective speeds; ranking the columns according to their preferred speeds; and for each of the columns and according to their ranked order, assigning the column to the fastest storage location based on free space of the storage location and a size of the column. Other embodiments of this aspect include corresponding systems, apparatus, and computer program products.

These and other aspects can optionally include one or more of the following features. Ranking the columns can further comprise identifying one or more first columns in the columns that are in a sort order for the projection; and assuming a faster preferred speed for the first columns than other columns when determining an order for the columns. If the columns are to be stored in grouped ROS format, the preferred speed for each of the columns can be an average of all the columns' preferred speed. If the columns are to be stored in grouped ROS format, the preferred speed for each of the columns can be a fastest preferred speed of the columns.

In general, another aspect of the subject matter described in this specification can be embodied in a method that includes determining that a plurality of new rows for a plurality of a projection's columns are to be stored in persistent storage wherein the determining is based a criterion, and wherein the projection's columns store data for a table in a database system; selecting a storage format for the new rows wherein the storage format is grouped ROS format or column format and wherein grouped ROS format stores a plurality of the projection's columns together in a single file and wherein column format stores columns of the projection in separate files; and storing the new rows in the selected format in persistent storage. Other embodiments of this aspect include corresponding systems, apparatus, and computer program products.

These and other aspects can optionally include one or more of the following features. The criterion can be an age of the new rows. The criterion can be a total size of the new rows. Selecting a storage format can be based on an assessment of existing storage allocated to the table's data such that some but not all of the table's data is always stored in grouped ROS format.

In general, another aspect of the subject matter described in this specification can be embodied in a method that includes selecting a plurality of candidate projection containers wherein each candidate container holds rows for one or more columns of the projection; identifying a plurality of containers to merge in the candidate containers; selecting a storage format wherein the storage format is grouped ROS format or column format and wherein grouped ROS format stores a plurality of the projection columns together in a single file and wherein column format stores columns of the projection in separate files; merging the identified containers into a new container according to the selected storage format; and wherein selecting a storage format is based on an assessment of existing storage allocated to the projection such that some but not all of projection data is stored in grouped ROS format. Other embodiments of this aspect include corresponding systems, apparatus, and computer program products.

These and other aspects can optionally include one or more of the following features. The selected candidate containers can be in a common size range. The identified containers can be each associated with a start epoch that is smaller than the remaining candidate containers.

In general, another aspect of the subject matter described in this specification can be embodied in a method that includes determining that data is to be added to a projection of a database based on at least one of a size or an age of the data; and storing the data in at least partly in grouped ROS format and partly in column format. Other embodiments of this aspect include corresponding systems, apparatus, and computer program products.

Particular aspects of the subject matter described in this specification can be implemented to realize one or more of the following advantages. Beneficial elements of a row-oriented storage format are incorporated into a column-store Database Management System (DBMS) and a column query engine to obtain superior performance. The DBMS automatically learns the access patterns of user applications and employs the best storage format. The DBMS architecture improves the efficiency of disk access and hence improves the performance of analytic queries. The performance characteristics of the underlying storage device are taken into consideration and therefore can be optimized for the specific usage patterns of the user application. For example, single record retrievals and updates can be processed using the row-oriented disk format, whereas large retrievals can be processed using a columnar or a hybrid format. Similarly, often used columns can be placed on faster disks or faster tracks on the disk and less used columns can be placed on slower disks or slower tracks on the disk. Another use of this mechanism is to automatically archive or write-protect data to Write Once, Read Many (WORM) storage for compliance purposes.

The DBMS automatically learns the access patterns of user applications and employs the best storage format. Explicit overrides of these behaviors are allowed by the user. A combination of in-memory and on-disk storage structures is used to optimize the performance of data loads and queries. Techniques are presented for moving data from memory to disk structures to optimize performance. Moreover, DBMS data in memory continuously trickles to disk a benefit of which is that data does not need to be loaded to disk at night.

The architecture of the system is such that columns do not have to be stored separated from one another on disk. Specifically, columns that are often accessed together may be stored together, when requested in the by an end-user. When columns are stored together, additional compression types to take advantage of this configuration will be available. For example, in stock ticker data, the bid and ask prices are closely related, and can be compressed relative to each other for space savings. Another benefit is that tables having a very large number of columns (e.g., tens of thousands) can be stored by grouping sets of columns into single files in order to reduce the number of files that need to be open in order to process queries.

The details of one or more embodiments are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

This specification describes the architecture of a DBMS for performing analytic queries on very large quantities of data. In this architecture, the performance of the DBMS can be optimized based on a combination of grouped ROS and column storage formats with knowledge of the performance characteristics of the underlying storage devices, for example. An implementation of this system is the FLEXSTORE™ system, available from Vertica Systems, Inc. of Billerica, Ma.

Figure 1:
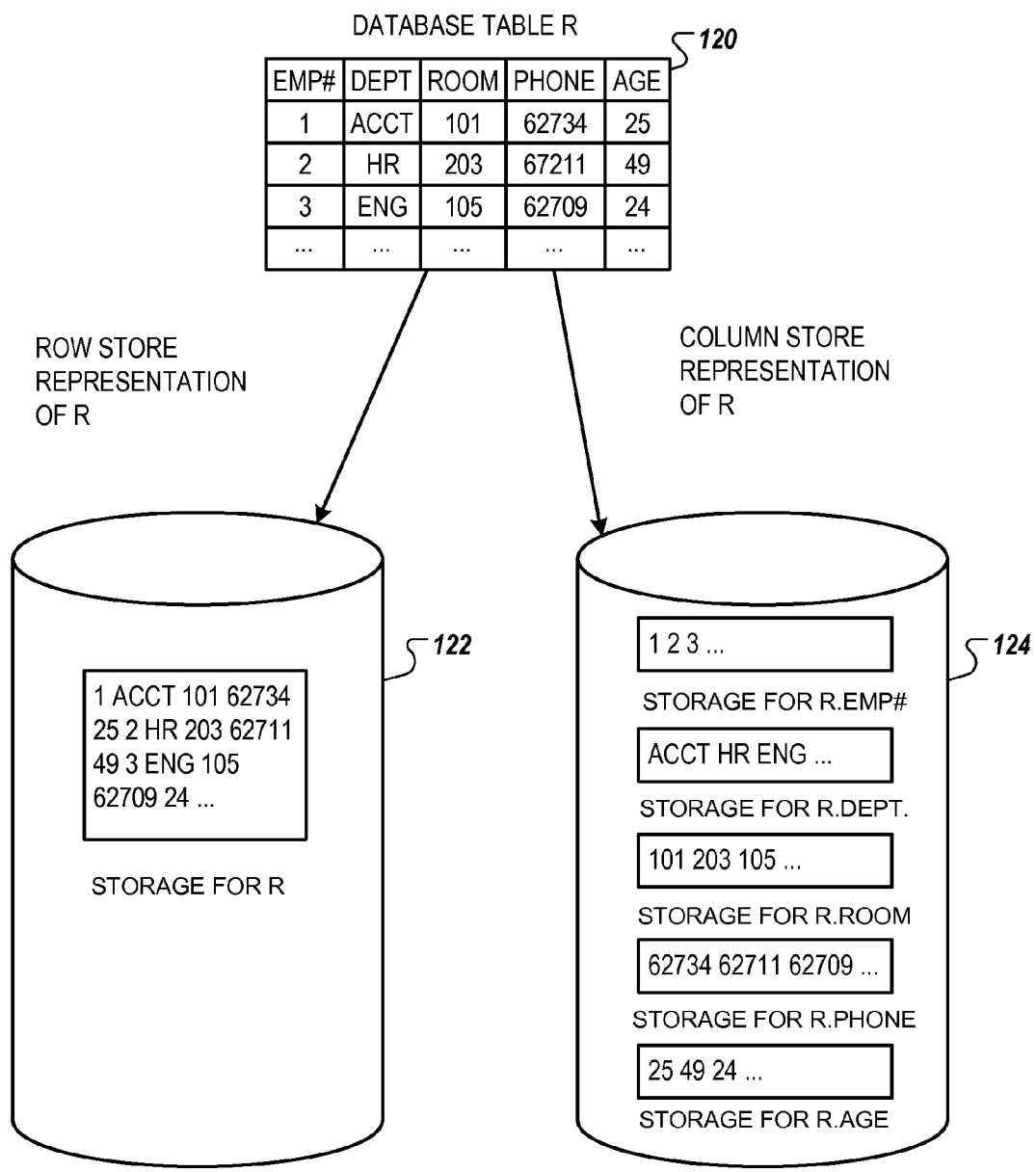
FIG. 1 illustrates grouped ROS and column representations of an example database table.
Figure 2:
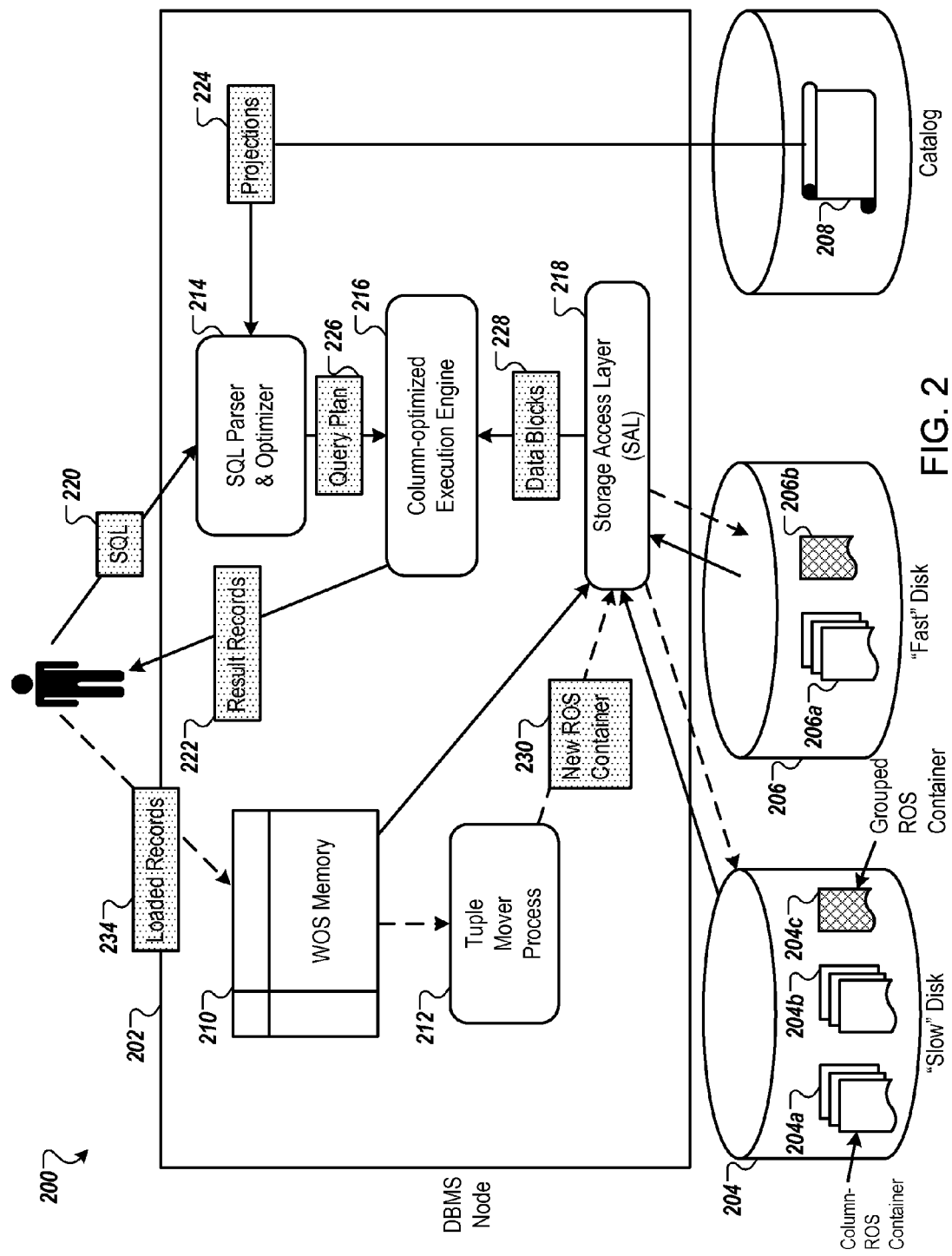
FIG. 2 is a schematic diagram of an example DBMS.

FIG. 2 is a schematic diagram of an example flexible column store system 200. The database software executes on one or more computing devices, referred to as a nodes (e.g., 202). By way of illustration, a computing device comprises one or more personal computers or workstations, rack-mounted computers, or special-purpose computers, for instance. Data for a table is physically stored in one or more projections that comprise subsets of columns from the table. The node 202 includes one or more disks for storing data such as disks 204 and 206 and an in-memory, write-optimized store (WOS) 210 which stores, in a row-wise fashion, data that is not yet written to disk. The WOS 210 acts as a cache. In some implementations, the node 202 includes a WOS 210 for each projection.

Projections are stored on disk in a read-optimized store (ROS). The ROS comprises of one or more ROS containers. (ROS containers are discussed further in reference to FIG. 5 below.) Data is moved out of the WOS 210 to one or more ROS containers periodically or if the data exceeds a certain configurable age or size threshold, for example. A ROS container stores one or more columns for a set of rows of a projection in column format (e.g., 204a, 204b) or grouped ROS format (e.g., 204c). Other beneficial ROS formats are possible. In column format, a given column's data can be retrieved from a ROS container separately from other columns' data. In grouped ROS format, some portion of data for all the columns stored in the grouped ROS will be retrieved from the ROS container when any of the other columns in the ROS container are accessed. In further implementations, empirical performance data and other performance related information about disks is used to intelligently place ROS containers in order to achieve better performance. (ROS container placement is discussed further in reference to FIG. 11 below.) By way of illustration, a disk 204 having slow access times and a large amount of storage space holds information from ROS containers 204a-c whereas a small disk 406 with faster throughput rates stores ROS containers 206a-b.

The system 200 illustrates two common operations performed on a database: a query (e.g., a SQL query) and a data load. The solid arrows illustrate the progress of a query 220 and the direction of data flow during a query processing. An end-user or an executing software program submits the query 220 to the system 200. The query 220 is parsed by a SQL parser 214 and provided to a query optimizer 214 which chooses the best projection(s) 224 for the query by referencing the catalog 208. Catalogs are discussed further in reference to FIG. 3 below.

A resulting query plan 226 is provided to an execution engine 216 which interacts with a Storage Access Layer (SAL) 218 to retrieve the data 228 responsive to the query 220 from the WOS 210 or the ROS, or both, and processes the data, before returning result records 222 back to the end user. The SAL 218 provides read and write access to WOS 210 and ROS storage. In some implementations, the execution engine 216 is a column-optimized engine designed to process data 228 in columns rather than in a row-by-row fashion. In yet further implementations, the execution engine 216 is capable of processing data 228 in its encoded form without first decoding the data.

An asynchronous background process known as the Tuple Mover 212 is responsible for migrating data from the WOS 210 to ROS containers (e.g., 204a-c) and for merging ROS containers. The Tuple Mover 212 is discussed further below in reference to FIG. 12. The hatched arrows illustrate the direction of processing and data flow during a data load. Data records 234 are loaded into the WOS 210 and eventually the Tuple Mover 212, based on its policy (as described below) will sort, compress and encode the data into either a column or a grouped ROS formatted ROS container 230. In some implementations, the Tuple Mover 212 will also select an appropriate disk location (as described below) to use to store each ROS.

Figure 3:
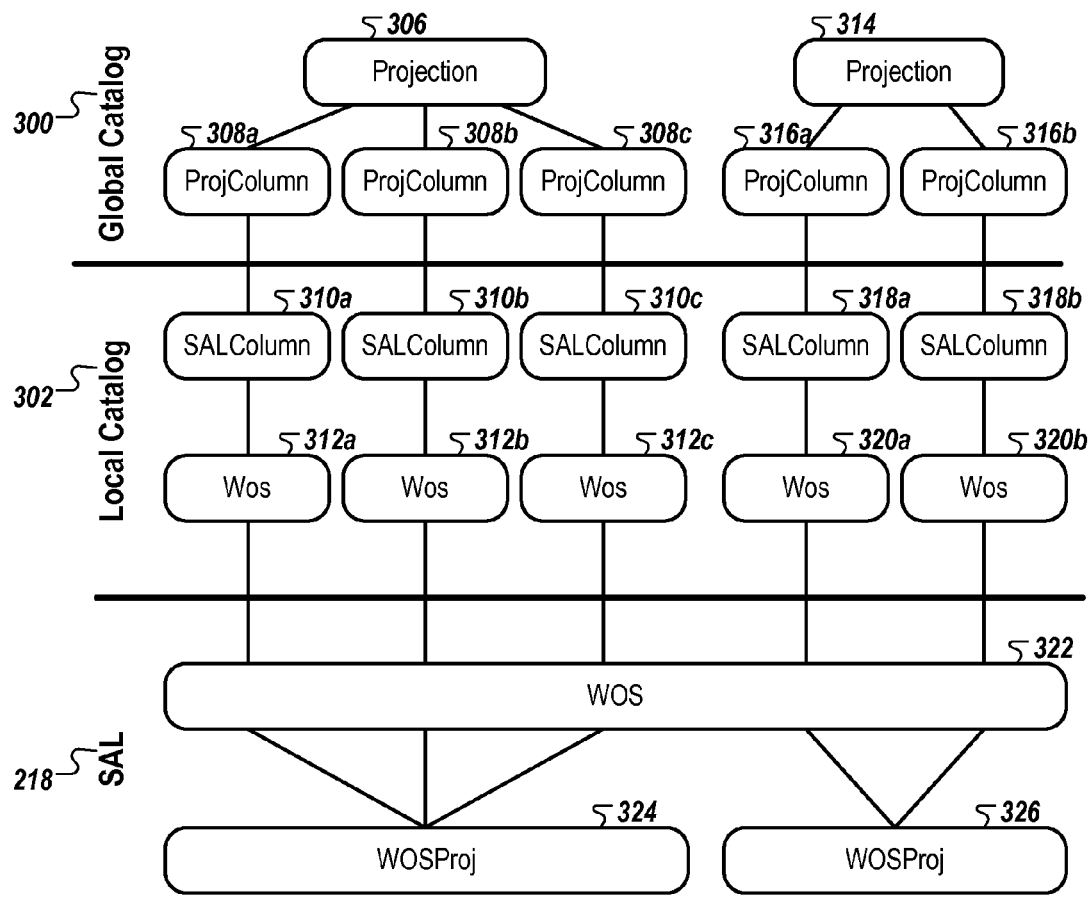
FIG. 3 illustrates global and local catalogs for an example system including a cluster of nodes.

FIG. 3 illustrates global and local catalogs for an example system including a cluster of nodes. (In some implementations, the system includes only a single node.) Each node in a cluster has a global catalog 300 and a local catalog 302. The global catalog 300 stores information about the projections and their columns across the entire cluster, including user, schema, table, and projection information, and is accessible from all nodes of the cluster. The local catalog 302 stores information that is known only to a specific node (e.g., 202) within the cluster, such as the ROS containers and their storage locations on the node, for instance. The SAL 218 provides access to WOS and ROS storage on the node. In some implementations, each projection has a WOS on each node that the projection's data is stored on. Likewise, all columns of a projection are stored in ROS containers on nodes where the data is present, each node having different sets of rows.

By way of illustration, the global catalog 300 includes information identifying two projections: 306 and 314. According to the global catalog 3, the 306 projection has three columns which are each represented by a ProjColumn data structure (308a-c) whereas the 314 projection has two columns each of which is represented by a ProjColumn data structure (316a-b). If data in a projection is available on a specific node in the cluster, the local catalog 302 for that node identifies how to access this data in columns of the projection. In this example, the columns 308a-c and 316a-b can be accessed through a specific node and, as such, the local catalog 302 includes SALColumn objects 310a-c and 318a-b representing the columns 308a-c and 316a-b, respectively. Each SALColumn object is associated with a local catalog Wos data structure. For example, the column identified by the SALColumn object 310a is associated with the local catalog Wos data structure 312a for that column.

The SAL 218 provides access to a WOS data structure 322 which stores a WOSProj object (e.g., 324, 326) for each projection (e.g., 306, 314), and provides a mapping from the local catalog Wos data structures (e.g., 312a) to WOSProj objects (e.g., 324). In various implementations, a WOSProj stores the information detailed in TABLE 1. Other information can be stored, however.

TABLE 1

Figure 4:
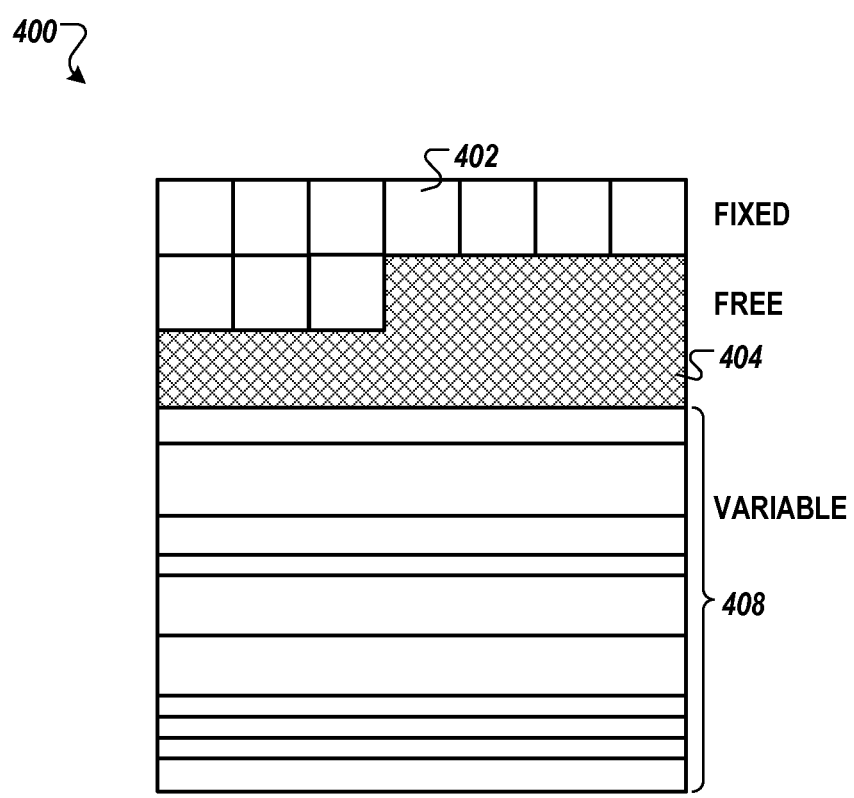
FIG. 4 illustrates an example WOS storage block.

| WOSPROJ INFORMATION | DESCRIPTION |
|---|---|
| Committed Data | In various implementations, committed data is stored as a vector of so-called WosBlocks. A committed WosBlock's number is its position in the committed vector.<br>A WosBlock 400 is a storage block consisting of fixed 402 and variable 408 data as shown in FIG. 4. Fixed implies that all values for grouped ROSd contiguously, from the start of the block. Strings and other variable width values reference the variable section 408. Variable implies data is allocated from bottom of block upward. A free pointer to the bottom of a free space area 404 is maintained. This allows variable length strings to be stored efficiently. |
| Uncommitted Data | In various implementations, uncommitted data is stored as a map of transaction identifiers to transaction information. Uncommitted WosBlocks for a transaction are positioned in the WOS after all committed WosBlocks.<br>In various implementations, transaction information comprises of a vector of WosBlocks 400 and save points. Save points can be created explicitly by a user or implicitly at the beginning of each new SQL statement so that upon error the transaction state can be rolled back to as if the statement never happened. As referred to herein, uncommitted[T] refers to the WosBlock in the uncommitted vector having the transaction identifier T. Save points are a map of save point identifiers to WOS positions. A WOS position is a 64 bit value - the 4 high bytes identify a WosBlock number and the low 4 bytes provided an offset within the block. Other types of WOS position representations are possible. |
| Epochs | In various implementations, there is a map between epochs and WosBlock positions referred to as an epoch map. An epoch is a monotonically increasing number that serves as a measure of time. In certain implementations, each transaction that occurs in the system will commit in a particular epoch. The epoch is advanced automatically every n minutes where n is configurable.<br>By way of illustration, with $2^{32}$ blocks in the WOS at minimum size of 4 Kilobytes each, the WOS occupies 16 Terabytes of memory. Assuming we allocate blocks to ensure that at least 2 rows fit in a block, the maximum row size is 1 Gigabyte. Other sizes of the WOS are possible. |
| Start | Start information indicates the amount of unused storage for the first committed WosBlock. |
| End | End information indicates the WOS position of last row in the committed WosBlock vector. |

In different implementations, objectives of the WOS are to stay within memory use limits, use memory efficiently, and tolerate fragmentation (e.g., allocating lots of 4 Kilobyte WosBlocks should not prevent allocating 8 Kilobyte WosBlocks, as long as overall memory use is within an acceptable limit). In some implementations, a WosBlock allocator process uses a virtual memory system on a node to handle fragmentation. By way of illustration, assume a 64 bit microprocessor (with minimally a 48 bit virtual address space). The WosBlock allocator maintains a set of regions: one per WosBlock size it supplies. Each region allocates a virtual memory region the size of a maximum WOS memory footprint (e.g., 25% of physical memory). Each region allocates WosBlocks of a single size, using a bitmap to track free blocks, for example. Whenever a WosBlock is referenced, the operating system finds a free page of physical memory and maps it into virtual memory. Whenever a WosBlock is freed by the WosBlock allocator, the allocator calls into the operating system (e.g., by invoking Unix memory functions such as mmap or madvise) and frees the physical pages associated with the WosBlock. The result is that the WOS occupies a large virtual address space, but the physical pages backing it do not exceed the WOS memory limit. By way of further illustration, for a 32 bit microprocessor the memory address space is limited to 32 bits (4 Gigabytes), thus making the address space and size of memory reasonably equivalent. In some implementations, the WosBlock allocator downgrades to a mechanism where it divides up the WOS memory evenly among the regions, resulting in an exponential scheme (e.g., twice as many 4 Kilobytes blocks as 8 Kilobyte blocks).

Because all information about a row in the WOS is shared across all columns of a projection, it is easy to annotate row-wise information. For example, the rows that correspond to each statement within a transaction can be used to roll-back changes made by a particular statement, or to implement the save points within the DBMS. In some implementations, the changes made to the WOS (e.g., inserts, updates and deletes) are annotated with a particular transaction or statement identifier, or save point name, as the case may be. When the system is requested to rollback the statement or transaction entirely to a specific save point, the relevant changes can be easily identified and removed from the database.

In various implementations, the WOS supports operations as detailed in TABLE 2. Other operations are possible, however.

TABLE 2

| OPERATION | DESCRIPTION |
| --- | --- |
| Read | In various implementations, the read operation causes the acquisition of references to all appropriate committed WosBlocks and uncommitted WosBlocks for the current transaction. In addition, start and end WOSProj information is cached. |
| Write | In various implementations, the write operation causes a row to be written as a unit to a WosBlock for an uncommitted transaction as follows: Compute space required: fixed size for row, plus size of strings; If the row will fit in the last WosBlock for the uncommitted transaction, store the row there (the last WosBlock is the last block used by the previous statement in this transaction, which may not be completed filled up yet); Otherwise, allocate a new WosBlock of size $2^k$, sufficient to store at least two rows of the current size, append the WosBlock to the uncommitted transaction's WosBlock list, and store the row in the newly allocated WosBlock; and Allocate WosBlock positions for the new WosBlock based on how many rows could fit (1 plus the number of minimum-size rows that can fit in the remaining space). Because subsequent rows can be packed into this WosBlock, enough sequential positions are allocated for a maximum number of rows. In this scheme, the amount of wasted space in the WOS can be bound to 50%, for example. There are two scenarios as follows: rows of size $(2^k) + 1$ result in WosBlocks of size $2^{(k+2)}$: 50% wasted; or rows of size $2^k$ alternating with rows of size 1: 50% wasted. Other ways of performing the write operation are possible. |
| Commit | In various implementations, the commit operation causes data to be copied from uncommitted[T] to the committed vector. If the commit epoch is not in the epoch map (e.g., first commit in new epoch), all WosBlocks from uncommitted[T] are appended to the committed vector and the WosBlock index of first appended block is added to epochs. Otherwise, the last WosBlock of committed from blocks of uncommitted[T] is packed, starting with last uncommitted row and moving backwards. Once the last WosBlock of the committed vector is full, remaining blocks of uncommitted[T] are appended thereto. This process copies at most 1 block of rows. This design can lead to densely packed blocks. In some implementations, deletes are handled by noting the positions of the rows being deleted. Packing results in changes to the positions of the packed rows. If a transaction inserts and deletes a row in the same transaction, the delete position may be made obsolete by packing. At commit time, the deleted positions can be recomputed. A row that is inserted and deleted by a transaction cannot be observed after the transaction commits. Thus, it is safe to actually delete such rows when the transaction commits. In some implementations, the WOSProj scans for deleted uncommitted values, prevents their being copied into the committed section, and thereby implicitly removes these entries. |
| Rollback | Discard uncommitted[T]. |
| Set Savepoint | Insert into the savepoint map the given savepoint identifier paired with the relative position of the last row of the given transaction. The position is relative to the beginning of the blocks of uncommitted[T], rather than the whole WOS projection. |
| Rollback to Savepoint | The savepoint identifier is looked up in savepoint position map, any blocks in uncommitted[T] past that position are discarded and the count and free pointers in the last WosBlock are updated. In addition, all savepoints with higher identifiers are discarded from the position map (they no longer point to valid positions). |

For a given node, there may be multiple ROS containers on disk storing some or all of a projection's data. The Tuple Mover process 212 depicted above in reference to FIG. 2 is responsible for migrating data from the WOS to ROS containers and for merging ROS containers. As a prelude to discussing the Tuple Mover process in more detail (see FIG. 12), the storage of data in ROS containers is described.

Figure 5:
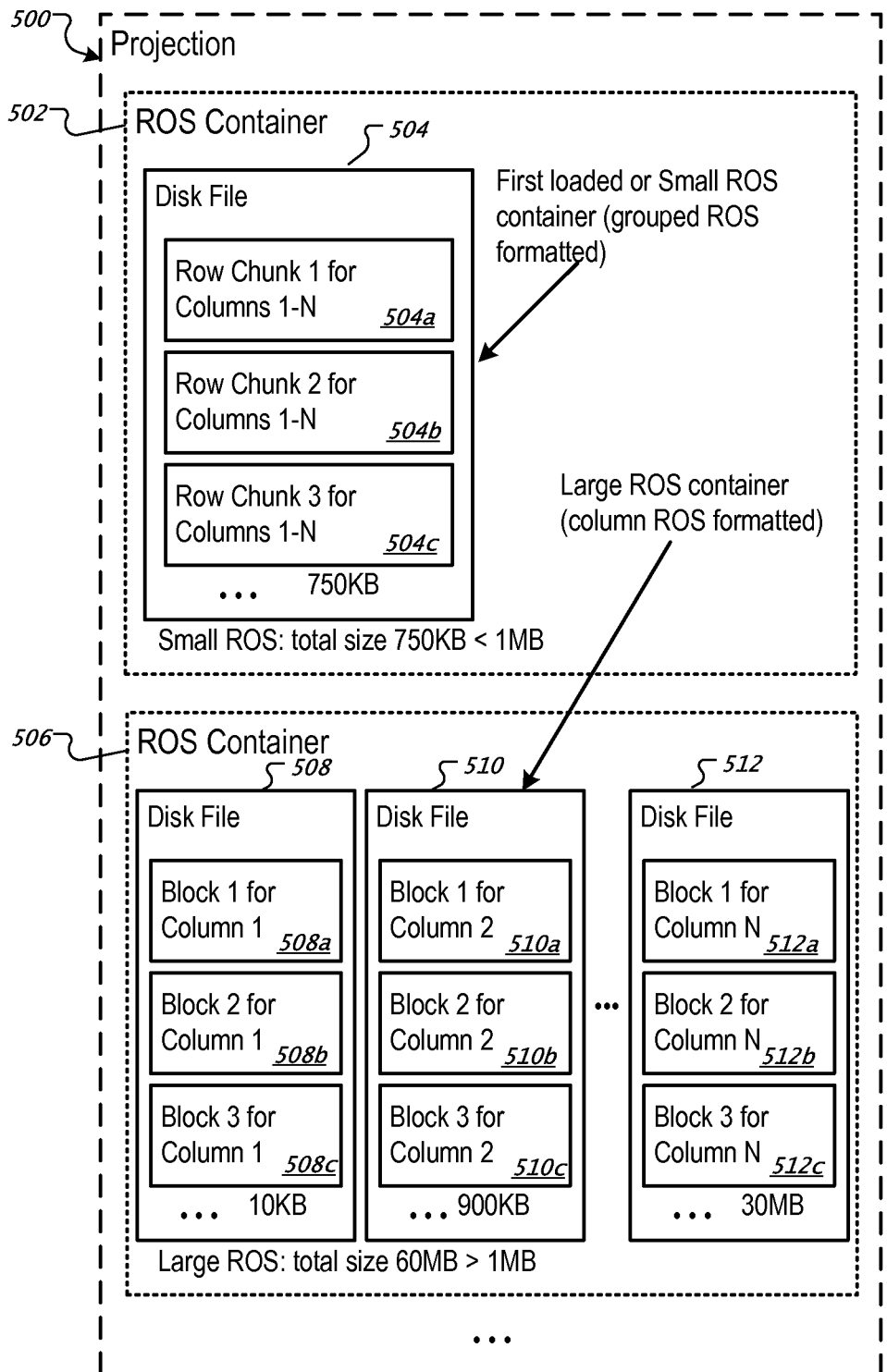
FIG. 5 illustrates a logical layout of grouped ROS and column formatted ROS containers for an example projection.

FIG. 5 illustrates a logical layout of grouped ROS and column formatted ROS containers for an example projection. In various implementations, a projection 700 is stored on disk as one or more ROS containers (e.g., 502, 504) in grouped ROS or column format. In further implementations, at least one of the ROS containers for the projection 700 is always in grouped ROS format. In this illustration ROS container 502 is in grouped ROS format and ROS container 506 is in column store format. The ROS container 502 is stored as a disk file 504 which comprises one or more blocks for a set of two or more columns 1 . . . N of the projection. Each block in a grouped ROS formatted ROS container holds data for some number of rows of the set of columns. (Note that a block is a logically contiguous chunk of the data and may or may not correspond to physical disk or file system block.) Block 504*a* contains a first set of rows for the set of columns, for instance. Block 504*b* contains a second set of rows for the set of columns. And block 504*c* contains a third set of rows for the set of columns.

The ROS container 506 is in column format. ROS containers in column format comprise one or more files where each file in the ROS container stores data for a different column of a projection. In this illustration the ROS container 506 comprises disk files 508, 510 and 512, each of which holds one or more blocks of data for a single column of the example projection. File 508 comprises blocks 508a-c. Block 508a holds attributes for a first number of positions for column 1. Block 508b holds attributes for a second number of positions for column 1. And block 508c holds attributes for a third number of positions for column 1. Likewise, file 510 comprises blocks 510a-c which hold attributes for a number of positions of column 2. And, file 512 comprises blocks 512a-c which hold attributes for a number of positions of column N.

Figure 6:
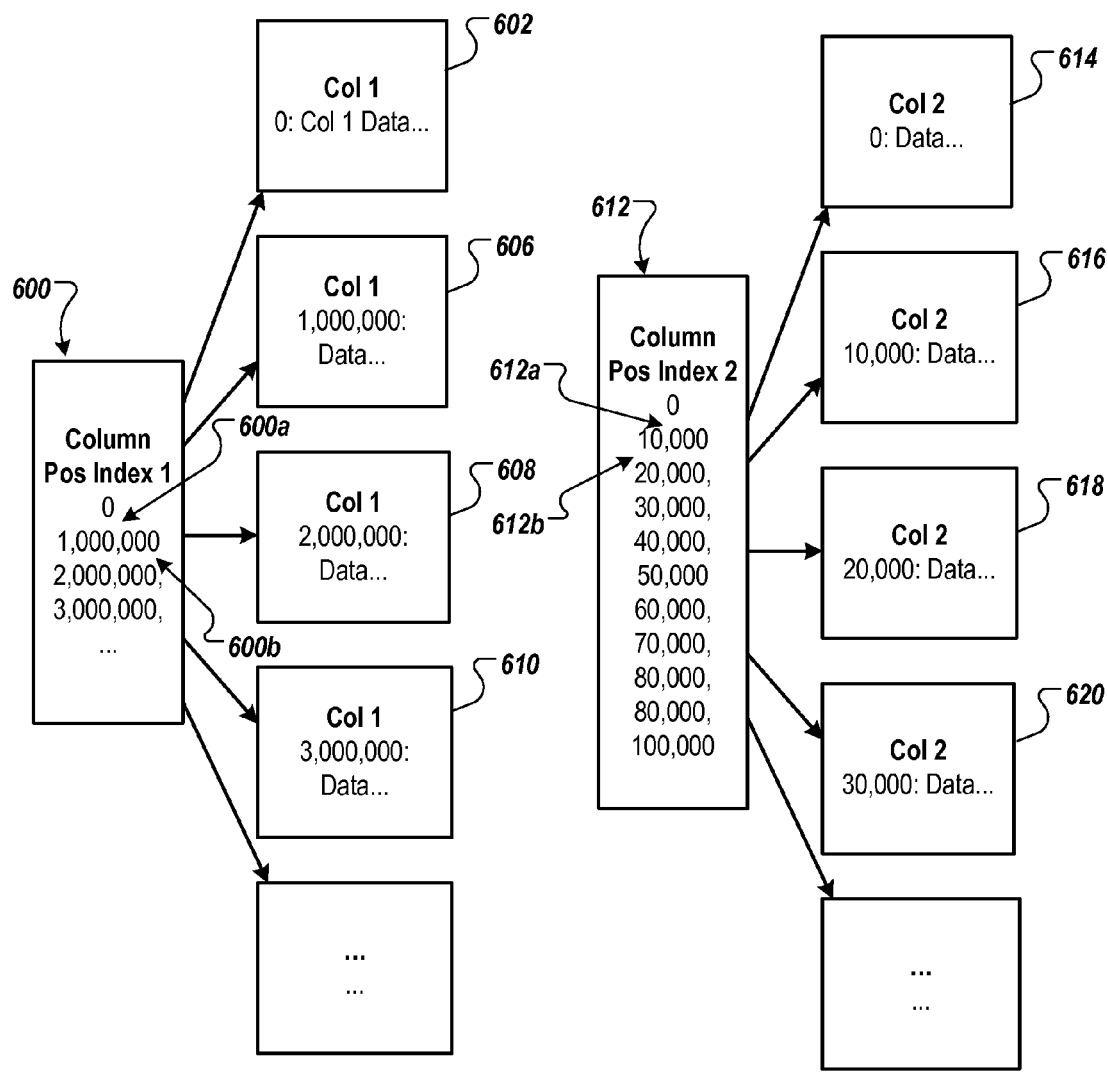
FIG. 6 illustrates an example index for a column formatted ROS container.

FIG. 6 illustrates an example index for a column formatted ROS container. An index is a position index used to tie data from different columns together. The position index 600 includes entries for each ROS container block. In a column formatted ROS container, each column's data is stored in separate file as a sequence of blocks and each file has its own index. In this example, column Col. 1's data is stored in blocks 602, 606, 608 and 610, and these blocks are indexed by index 600. (There is an implicit position number associated with records within columns.) An index stores entries relating the starting position number and a file offset of a block containing the data for the position. For example, index entry 600a indicates that positions 0 through 999,999 for column 1 are stored in block 602, entry 600b indicates that positions 1,000,000 through 1,999,999 are stored in block 606, and so on. Likewise column Col. 2's data is stored in blocks 614, 616, 618 and 620, and these blocks are indexed by index 612. Index entry 612a indicates that positions 0 through 9,999 for column 2 are stored in block 614, entry 612b indicates that positions 10,000 through 19,999 are stored in block 766, and so on. In order to access position 645 column 2, for example, the index 612 is first checked to determine the offset of the block that contains the position. Index entry 612a indicates that block 614 contains position 645. Block 614 is then scanned to locate the position data within the block. Note that if only Col. 2's data is needed for a query, then neither the index nor the blocks for Col. 1 are touched. All column values for a specific row in a table can be retrieved by looking up each column's position index in turn—thus the position indexes serve to connect different columns across multiple files. Other block indexes are possible.

Figure 7:
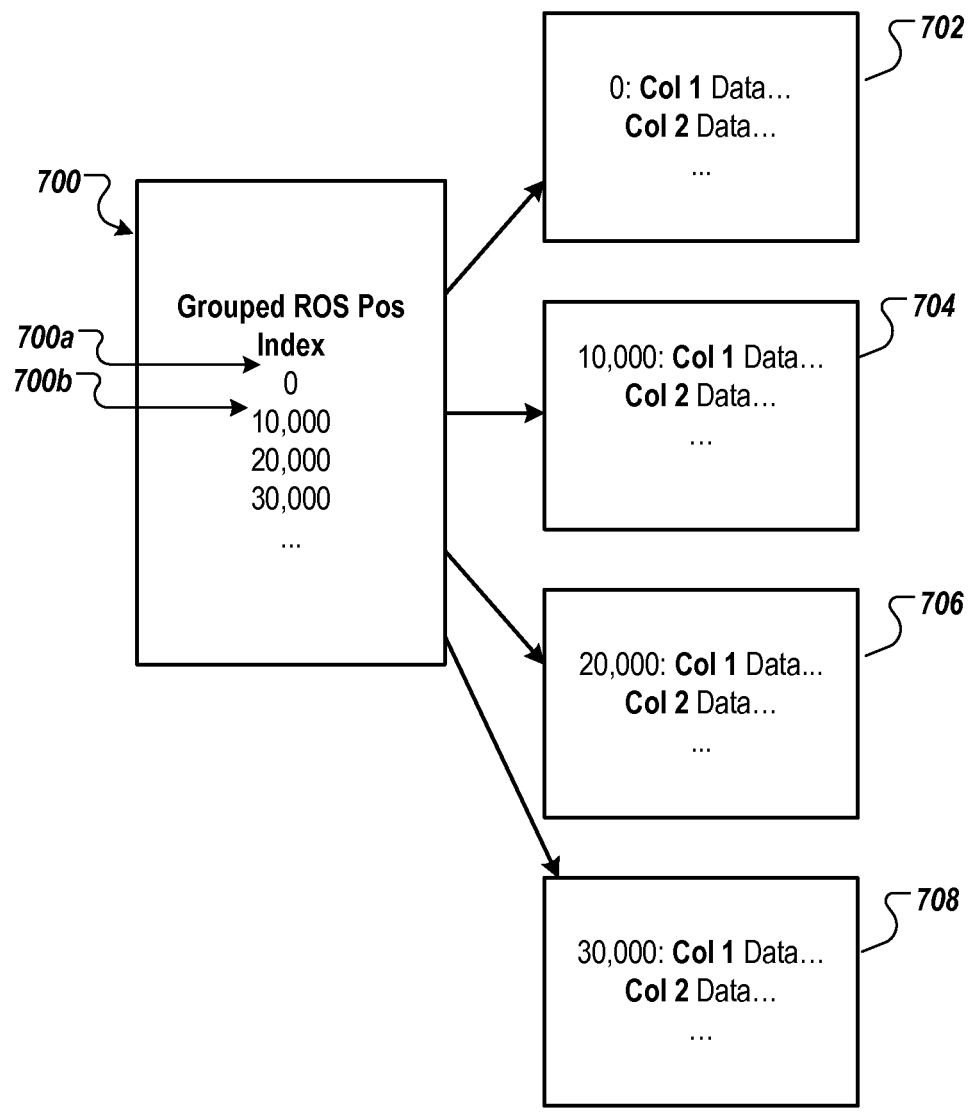
FIG. 7 illustrates an example index for a grouped ROS formatted ROS container.

FIG. 7 illustrates an example position index for a grouped ROS formatted ROS container. The index 700 includes entries relating a starting position (e.g., a row) stored in the ROS container to a file offset of the block that stores the row. For example, index entry 700a indicates that positions 0 through 9,999 are stored in block 702, entry 700b indicates that positions 10,000 through 19,999 are stored in block 704, and so on. In order to access position 15,324, the index 700 is first checked to determine the file offset of the block that contains the position. Index entry 700b indicates that block 704 contains position 15,324. Block 704 is then scanned to locate the position data within the block. Other block indexes are possible. In the grouped ROS format, each block stores values of multiple columns for some number of rows and therefore there is a single index across all the columns. When storing Col1 and Col2 in a grouped ROS and retrieving position 20,000, for instance, it is not possible to retrieve column Col 1's data without also retrieving column Col 2's data as well.

Figure 8A:
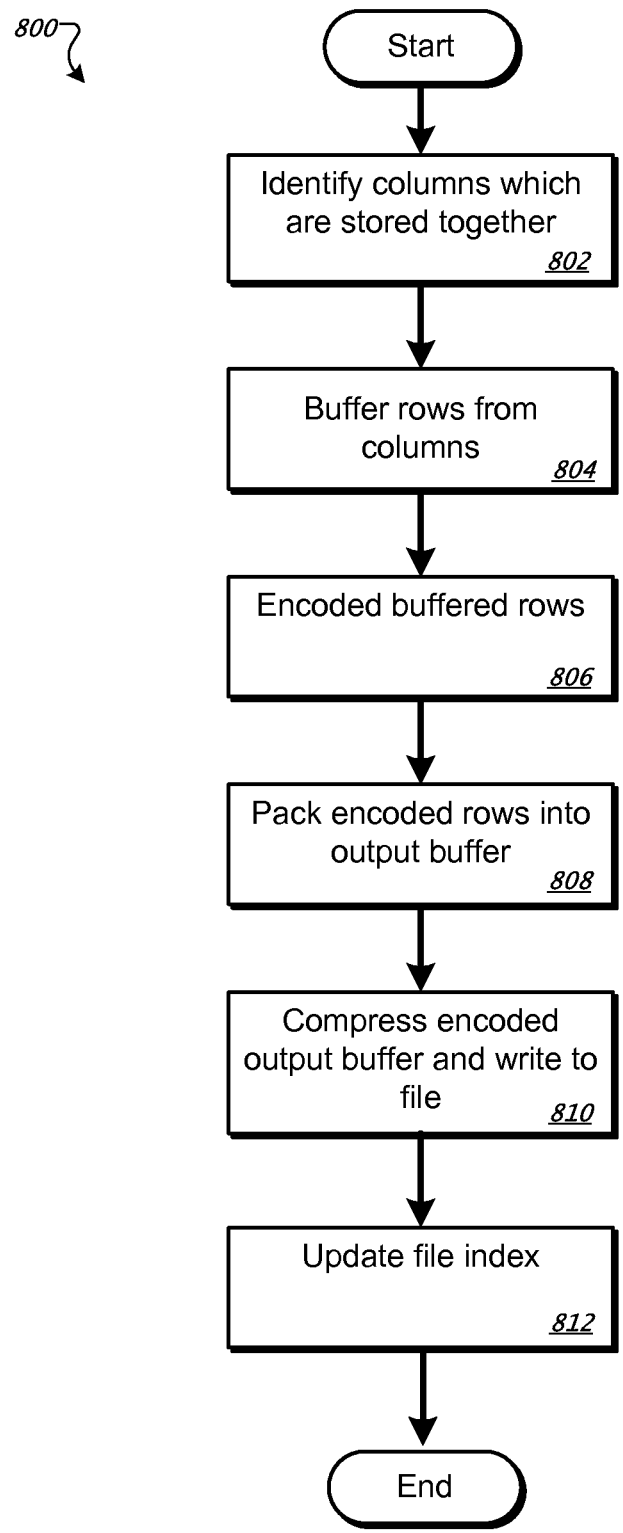
FIG. 8A is a flow chart of an example technique for writing data to a grouped ROS formatted ROS container.
Figure 8B:
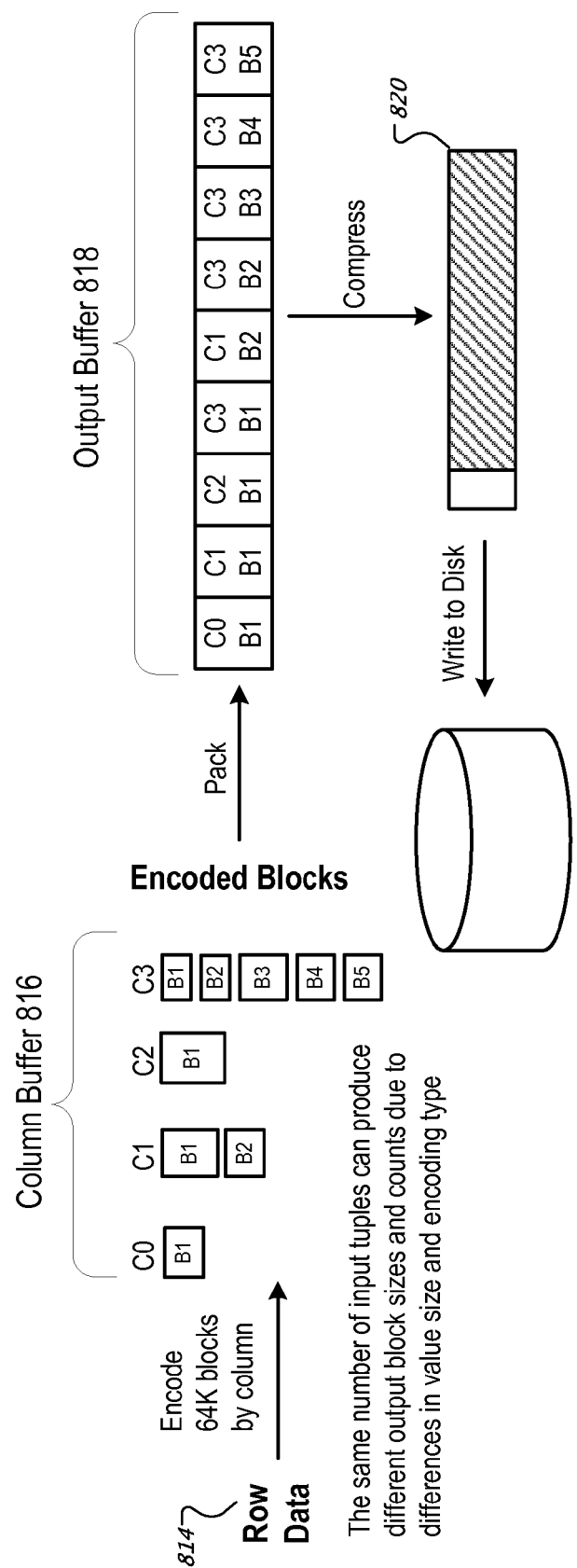
FIG. 8B illustrates writing data to a grouped ROS formatted ROS container.

FIG. 8A is a flow chart 800 of an example technique for writing data to a grouped ROS formatted ROS container. The local catalog (e.g., 302) is accessed to identify which columns of a projection are stored together and their order for a particular node (step 802). Rows from the identified columns are buffered in column buffer 816 (FIG. 8B) until there is a suitable size chunk of data (step 804). For tables with large rows (e.g., many columns, large variable length character strings), this may be a small number of rows. Column-based encoders on then run on each column in the column buffer 816 to generate output blocks (step 806). In some implementations, an encoder consumes column data from the column buffer 816 until it fills up a 64K output encoded output block. Due to differences in column values and column encodings, the same number of rows may produce different numbers of output encode blocks for each column (e.g., an integer column which is run length encoded into a small number of bytes versus a large column of variable length character strings where each value is 64K). The blocks output from the encoding step are written sequentially or packed into an output buffer 818 (FIG. 8B) in a round robin fashion (step 808).

For example, if data from columns 1, 2 and 3 are to be stored together in the grouped ROS formatted ROS container, the output buffer 818 would be filled with a first encoded block for column 1, followed by a first encoded block for column 2, followed by a first encoded block for column 3, followed by a second encoded block for column 1, followed by a second encoded block for column 2, and so on. Due to the variable number of blocks per column, blocks include a header that identifies which column the block is for along with the position range the block includes. In some implementations, the output buffer 818 is compressed 820 (FIG. 8B) with LZO or some other compression technique. The output buffer 1018 is then written as a block to a file for the grouped ROS formatted ROS container (step 810). An entry (e.g., 600c) into a position index (e.g., 600) for the grouped ROS formatted ROS container is added indicating the starting position of the first block in the buffer and the block's offset within the file (step 812).

Figure 9A:
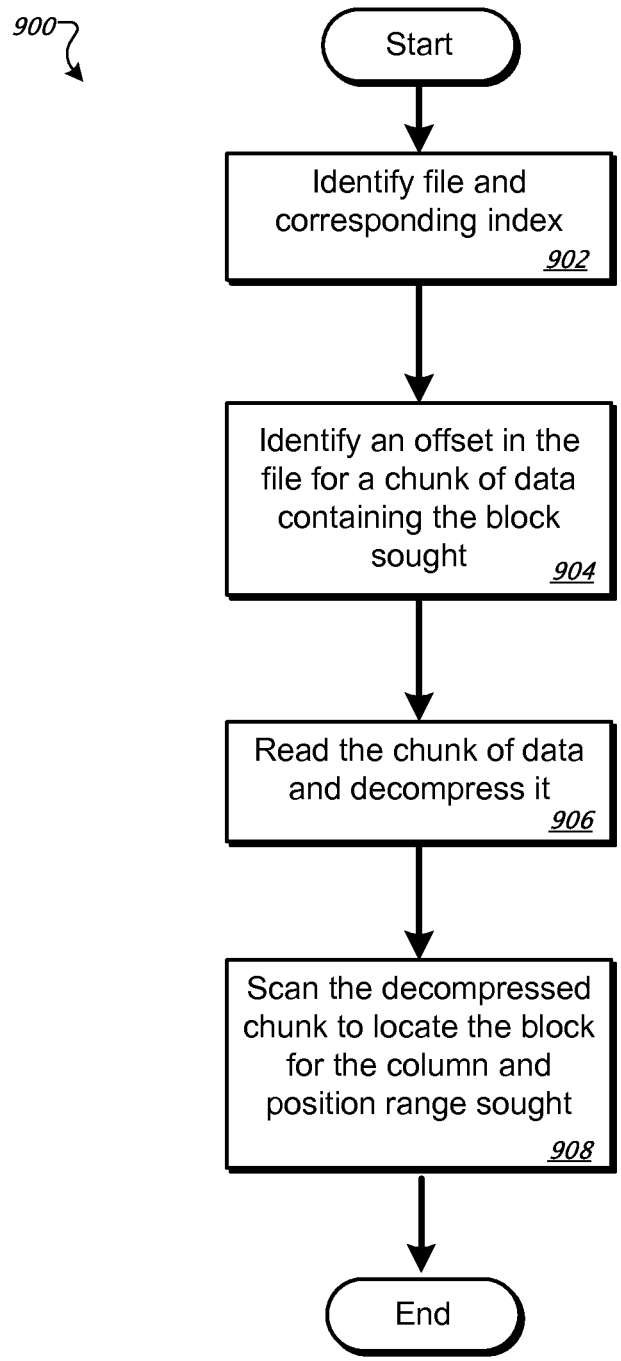
FIG. 9A is a flow chart of an example technique for reading data from a grouped ROS formatted ROS container.
Figure 9B:
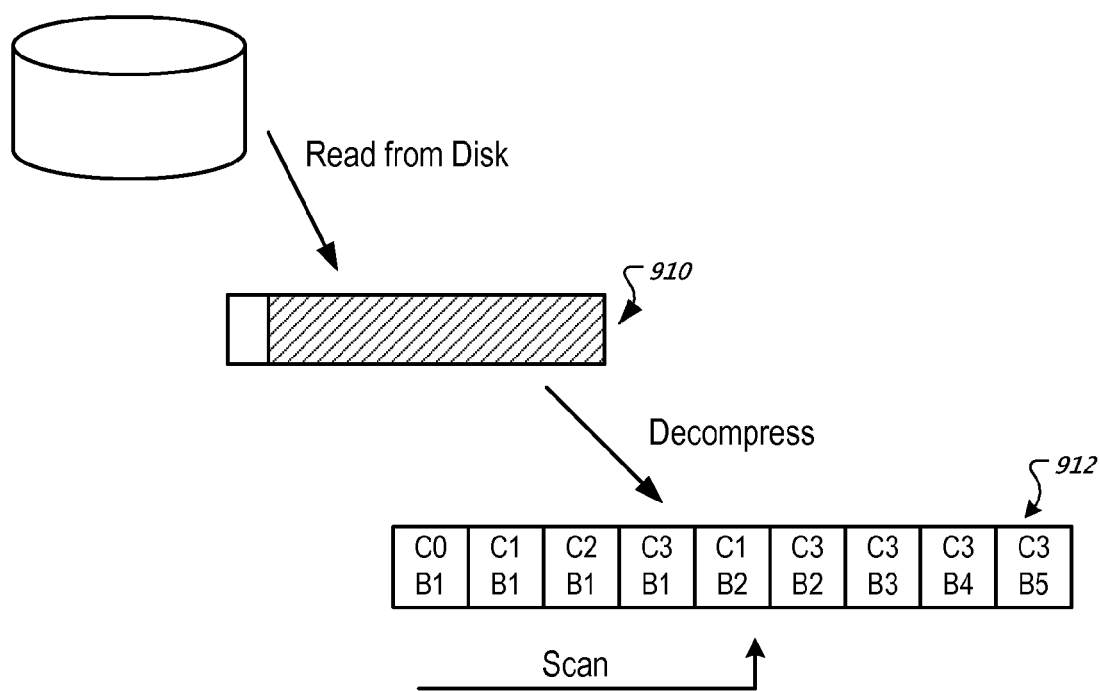
FIG. 9B illustrates reading data from a grouped ROS formatted ROS container.

FIG. 9A is a flow chart 900 of an example technique for reading data from a grouped ROS formatted ROS container. The local catalog (e.g., 302) is accessed to identify the file used by the grouped ROS formatted ROS container and its index (step 902). The index is then consulted to identify an offset in the file for a chunk of data that contains the block sought based on the position (e.g., row; step 904). The chunk 910 (FIG. 11B) is then read from the file based on its offset and decompressed into buffer 912 (step 906). The chunk 910 is opaque until it is decompressed. Next, the buffer 912's (FIG. 9B) blocks are then scanned by examining block headers until the block for the correct column and position range is found (step 908). In some implementations, multiple reads can use caching for improved performance, e.g., keep the file open, cache the decompressed chunk, and maintain a pointer into the list of blocks for sequential traversals.

In various implementations, a projection can be declared as row optimized, hybrid optimized, or auto optimized. This indicates the type of storage format to be employed for the ROS containers used to store data for the projection. In some implementations, projections are declared auto optimized by default. TABLE 3 below describes the different projection types in additional detail.

TABLE 3

| PROJECTION TYPE | DESCRIPTION |
| --- | --- |
| Row Optimized | In a row optimized projection, only a grouped ROS format of each ROS container will be stored. This optimizes for row operations such as UPDATE/DELETE or a single row or sparse SELECT, at a minimum space cost, since only one copy of the data will be stored. In further implementations, a ROS container is in row optimized format if the 'GROUPED' syntax is used to declare a projection. This is described further below. |
| Auto Optimized | In an auto optimized projection, the general policy employed will be that small ROS containers will be stored in the grouped ROS format and large ROS containers will be stored in the column format. In order to establish how many rows constitute a "large" ROS container, the number of bytes per row can be determined. Since the number of bytes per row is not known ahead of time, in some implementations the first ROS container created for every projection will be stored in a grouped ROS format regardless of its size, to be used as a benchmark for future selection. After the first ROS container has been loaded, the statistics collected on the data are used to estimate whether future ROS containers would be considered large or small and the appropriate format is chosen. In further implementations, as the Tuple Mover subsequently merges ROS containers, the Tuple Mover continues to maintain the invariant that there will be at least one such ROS container available in grouped ROS format only at all times to serve as a benchmark for size. In further implementations, auto optimized can be switched to hybrid optimized if numerous row operations are detected and space is available. Note that in some implementations because at least one ROS is stored in grouped ROS format for sizing as described above, there is no need for a "column optimized" option separate from auto optimized. |
| Hybrid Optimized | In a hybrid optimized projection, a grouped ROS format will be used for small containers, while redundant grouped ROS and column formats will be selected for large ROS containers. This ensures high performance of UPDATE/DELETE/single row SELECT in many situations, plus high performance aggregation queries on a few columns. Hybrid optimized can be switched to row or auto optimized to save space. In some implementations, as with auto optimized, the first ROS container will be in grouped ROS format to provide information about the physical size of a row. |

In some implementations, automatic optimization will employ a policy that requires small ROS containers to be grouped ROS formatted and larger ROS containers to be stored as row-formatted, column-formatted, or both—except that at least one ROS container will be kept in grouped ROS format. In order to establish how many rows constitute a "large" ROS container, the number of bytes/row can be determined. Since the number of bytes/row is not known ahead of time, the first ROS created for every projection can be stored as rows regardless of its size, to be used as a benchmark for future selection. Subsequently, as the Tuple Mover merges ROS containers, it continues to maintain the invariant that there will be at least one such ROS container available in grouped ROS format at all times to serve as a benchmark for size.

In various implementations, a so-called DataTarget operator that writes the data to a WOS or a ROS container is capable of automatically and dynamically switching the destination storage type while it is running. There are at least four advantages of this technique:

1) If the size of the load is very small, the DataTarget operator could have been targeting the in-memory WOS as the storage. However, space in the WOS may become unavailable due to other concurrent processing. By switching to storing data in a ROS container mid-operation, the load operation can continue.
2) If the size is larger than is appropriate for the WOS, the compression factor becomes important. However, compression rates depend on the data. By starting with a grouped ROS formatted ROS container large enough to even out any transients, the expected post-compression size of the total load can be estimated. If the total load is large, the DataTarget operator can switch to a column formatted ROS container output on the fly to take advantage of column benefits.
3) In some implementations, query performance may be improved by distributing the data in multiple ROS containers so that data could be read in parallel.
4) In further implementations, a table may be partitioned by a specific expression to segregate data so that any particular partition can later be dropped quickly. For example, data may be partitioned by month so that the oldest month of data can be dropped easily. In such systems, the Data Target operator can choose to store data from different partitions in separate containers. Furthermore, the type of container (WOS, grouped ROS formatted ROS container, column formatted ROS container) can be particular to the amount of data involved in each partition.

In a typical implementation of a DataTarget operator that does not dynamically choose the destination container type, the catalog entries (described earlier in reference to FIG. 3) for the storage containers to store the resulting data can be created before the operation starts. During execution, the DataTarget writes data into a set of files. Upon completion, additional changes may be made to the catalog to include information about file sizes, and so on. In some implementation, temporary file names may be initially used and finally updated to permanent files in the database after the operation is complete.

In various implementations of a DataTarget operator that dynamically chooses the destination container type, the DataTarget operator would no longer create the catalog entries apriori. Before execution, the DataTarget would use the catalog to discover which storage locations it should use for any files (possibly with temporary names) it might create, but not make any changes to the catalog. During execution, the DataTarget would write to files just as before. Switching targets merely requires opening a new file and beginning to write. Upon completion, the DataTarget operator would create the requisite catalog entries with the file names of the files it added.

Figure 10:
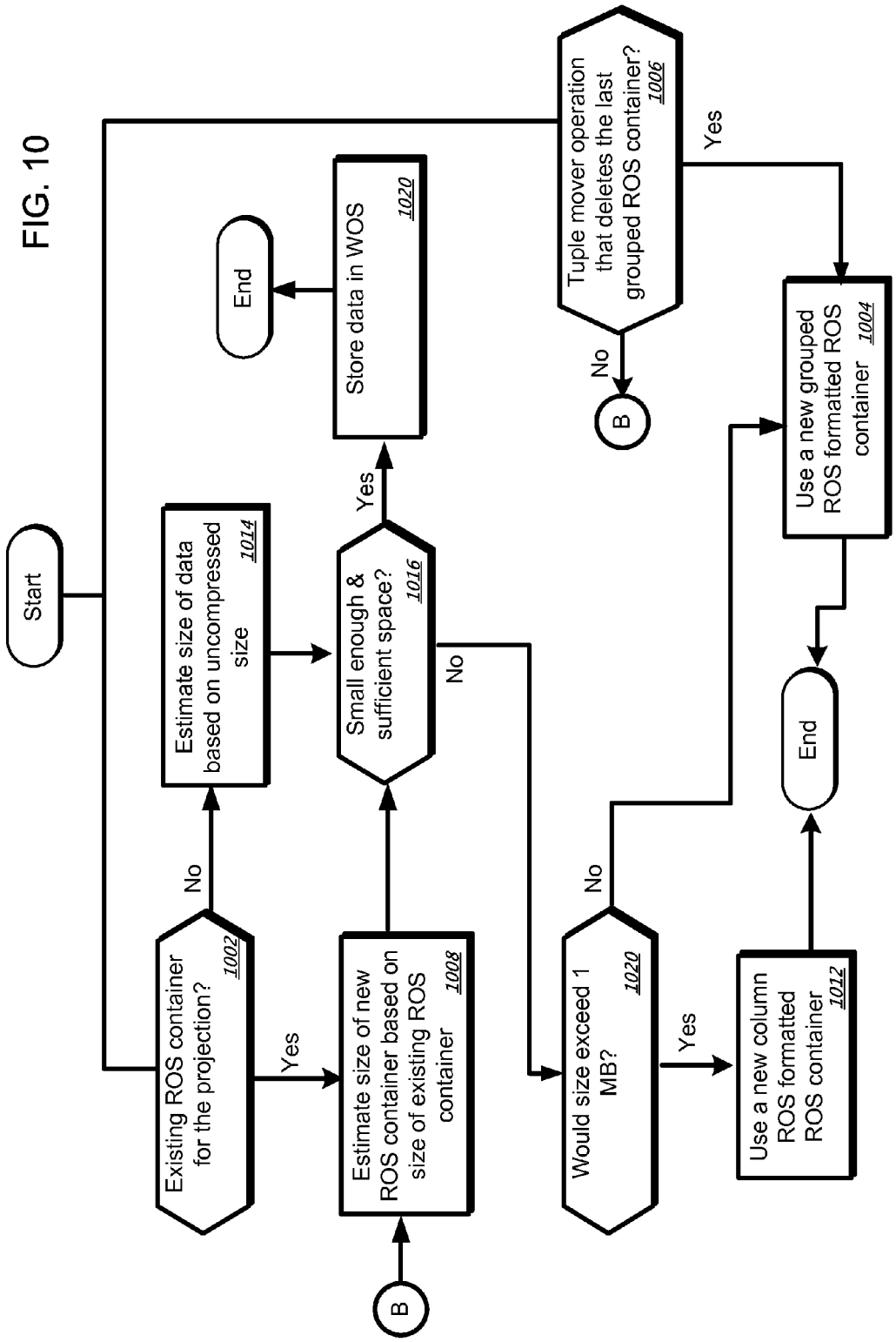
FIG. 10 is a flow chart of an example technique for determining the format of a new ROS container for auto or hybrid optimized projection based on updating patterns for the projection.

FIG. 10 is a flow chart of an example technique for determining the format (e.g., row or column) of a new ROS container for an auto or hybrid optimized projection based on updating patterns for a projection. If there is an existing ROS container for the projection (step 1002), then the size of a new ROS container based on the size of an existing ROS container is estimated (step 1008). If the size of the uncompressed data (e.g., all columns) is small, for example the expected compressed size is less than a minimum read size threshold (e.g., 1 MB)*expected compression ratio, and there is sufficient free space in the WOS (step 1016), the data is stored in the WOS (step 1020). Otherwise, if the estimated size would exceed 1 megabyte (MB) per column, or some other size threshold, (step 1020), a new column formatted ROS container is used to store the data depending on the optimization (auto or hybrid; step 1012). Otherwise, a grouped ROS formatted ROS container (step 1004) is used to store the rows.

If there is not an existing ROS container for the projection (step 1002) because, for instance, the projection's data is sourced via a network socket or from a query whose output size is difficult to estimate accurately, the size of the projection is estimated based on its uncompressed size and a compression ratio (step 1014). In implementations where data is stored on disk in sorted order and compressed in projections, the data goes through a sort operation before it is compressed and written to disk. A sort operation by its nature cannot complete until it has included every row. Thus, before data actually is written to disk, the uncompressed size of the data is known.

If the size of the uncompressed data (all columns) is small, for example the expected compressed size is less than a minimum read size threshold (e.g., 1 MB) * expected compression ratio, and there is sufficient free space in the WOS (step 1016), the data is stored in the WOS (step 1020). Otherwise, if the estimated size would exceed 1 megabyte (MB) per column, or some other size threshold, (step 1020), a new column formatted ROS container is used to store the data depending on the optimization (auto or hybrid; step 1012). Otherwise, a grouped ROS formatted ROS container (step 1004) is used to store the rows.

If this is a Tuple Mover operation that deletes its sources (e.g., a merge-out operation that merges two ROS containers into a new one and deletes the old containers when it is finished), and it will delete the last grouped ROS formatted ROS container (step 1006), a grouped ROS format is used for the new ROS container (step 1004). Otherwise, the logic continues at step 1008, which is described above.

The next section describes how these formats can be employed as user specified overrides in an illustrative implementation. As described earlier, the system stores data in projections which store subsets of columns of a table in a given sort order and specifying an encoding/compression type for each column. An example of syntax to create a projection is as follows:

```
create projection p (col1 encoding RLE, col2 encoding RLE,
    col3 encoding AUTO)
as
select col1, col2, col3 from table
    order by col1, col2;
```

In the above example, projection 'p' is defined as having columns 'col1' and 'col2' which are encoded using RLE whereas column 'col3' has 'AUTO' encoding which specifies that an appropriate encoding type will be chosen automatically. The following example illustrates a projection syntax that can specify row, automatic or hybrid optimized storage for the projection:

```
create projection p (col1 encoding RLE, col2 encoding RLE, col3
encoding NONE)
    STORAGE HYBRID
    as
    select col1, col2, col3 from table
        order by col1, col2;
```

In the above example, projection 'p' will be stored in hybrid optimized format. Alternatively, 'ROW' or 'AUTO' could be specified in place of 'HYBRID' to indicate that projection 'p' will be stored in row or auto optimized storage, respectively. In further implementations, 'ROW' does not have to be specified if the projection is created using the 'GROUPED' keyword, described next.

In further implementations, the projection syntax is extended to specify that certain columns are to be stored together in a row-oriented format. Projection columns can be defined with the 'GROUPED' (<other column (s)>) clause to indicate that they are to be stored with one or more other columns, for instance. Projection columns that have the 'GROUPED' keyword specified can be encoded with an additional '[RELATIVE TO <col>]' clause, after the encoding. If 'RELATIVE TO' is specified, compression is treated as relative to the GROUPED column.

For example:

```
create projection p (GROUPED col1 encoding RLE,
    col2 encoding DELTAVAL [RELATIVE TO col1],
    col3 encoding AUTO)
    as
    select col1, col2, col3 from table
        order by col1, col2;
```

In the above example, columns 'col1' and 'col2' will be stored together as a group in the same file in grouped ROS format. Here '[RELATIVE TO]' indicates subtraction, and is applied to integer-based types of equal widths (e.g., int8, date, time, float (treated as integer), and numeric (only if the precision and scale are the same)). Column 'col2' will be encoded relative to column 'col1'. In further implementations, an RLE encoded column that is to be 'GROUPED' with another column can be compressed to the same cardinality.

Storage Locations

It is observed that disk drives are typically faster on their outer tracks than on the inner tracks; but logically partitioning disks into two partitions leads to ~80% of the benefit of careful placement, while partitioning into 3 partitions leads to ~90% of the benefit. In various implementations, this empirical data and other performance related information about storage devices will be utilized to intelligently place data to achieve better performance. The performance characteristics of the storage such as sustained throughput (megabytes/second) and random seek time (milliseconds) will be recorded, for reads and writes, for instance. These properties can be measured automatically when a storage device is added to the database (henceforth known as a storage locations within the DBMS) and can also be specified by users. Note that multiple storage locations can be created from the same physical disk—for example, a disk could be partitioned into inner and outer tracks and a storage location created out of each one.

In further implementations, storage locations can be tagged based on their use—for instance as DATA (used to store permanent data), TEMP (used to store temporary data), ARCHIVE (used to store infrequently accessed archived data), and so on. Components within the system 200 can explicitly request a storage location of a particular type. For example a Sort Operator process within the Execution Engine 216 may ask for a TEMP storage location to keep its intermediate sorted blocks of data. Similarly, when deleting old data from the database, users can request that data to be archived to a storage location of type ARCHIVE, which could be a high-capacity but low-performance disk array. In yet further implementations, as solid state disks become more prevalent, the tags could be used to advise the system 200 of the specific write characteristics of the solid state disks, which could be used to optimize the database storage and input/output algorithms.

In an illustrative implementation, storage locations are added to the database by using a function call known as 'add_location' as follows:
 select add_location('<path>','<node>', 'DATA|TEMP|ARCHIVE');

This function call tags the storage location according to its projected usage as a storage for permanent, temporary or archive data. The '<path>' parameter refers to the actual file or directory where data will be stored. The '<node>' parameter refers to the database node where the additional storage is being added. In some implementations, the '<node>' parameter is not required if, for example, the database is implemented on a single node rather than a cluster. A storage location can also have more than one tag associated with it—by default, a storage location can be used for both 'DATA' and 'TEMP' storage. In some implementations, there is at least one 'DATA' and one 'TEMP' location for a system 400, possibly the same location serving both uses.

The tag for a storage location can be altered if the storage location is being re-purposed. For example, older disks may be re-purposed to serve as archive storage in future.
 select alter_storage_use('<path>','<node>', 'DATA|TEMP|ARCHIVE');

Once tagged, the storage locations of a specific type can be requested by various operations.

In further implementations, performance characteristics of storage locations can be measured automatically (or set by users) and saved by the DBMS by invoking a routine follows.

```
select measure_storage_performance('<path>','<node>');
or
set_storage_performance('<node>','<path>','<throughput>',
   '<avg latency>');
```

In the above functions, the '<path>' and '<node>' parameters have the same meanings as before. The '<throughput>' and '<avg latency>' parameters refer to the sustained throughput and average disk seek time for the storage device underlying the given location. From the throughput and latency, a speed number is calculated based on an anticipated pattern of 1 MB random I/Os, thus add the latency to the time to transfer 1 MB at given throughput. Other ways of determining a speed number are possible. Each storage location is thus associated with a single speed number that represents its performance characteristics.

In further implementations, the projection syntax is extended to include the following parameters:
 <name> [ENCODING <type>] [SPEED n]
to indicate preferred speed of a storage location to use for a column. For example:

```
create projection (col1 [ENCODING <type>] [SPEED n], ...)
as
...
order by ...
```

In some implementations, a 'SPEED' is specified as an integer, relative to the default priority of 1000. Columns with smaller numbers will be placed on slower disks, higher numbers on faster disks. In some implementations, if the 'SPEED' parameter is not specified, columns in the sort order (order by) will be given higher priority (e.g., numbers>1000), with the last column in the sort order receiving 1001, and the first column in the sort order given the highest priority (1000+# of sort columns). Remaining columns will be given numbers starting at 1000 and working down (never to go below 1). As a result, in the default configuration, any multi-column projection can have a mix of speed settings associated with the columns.

Figure 11:
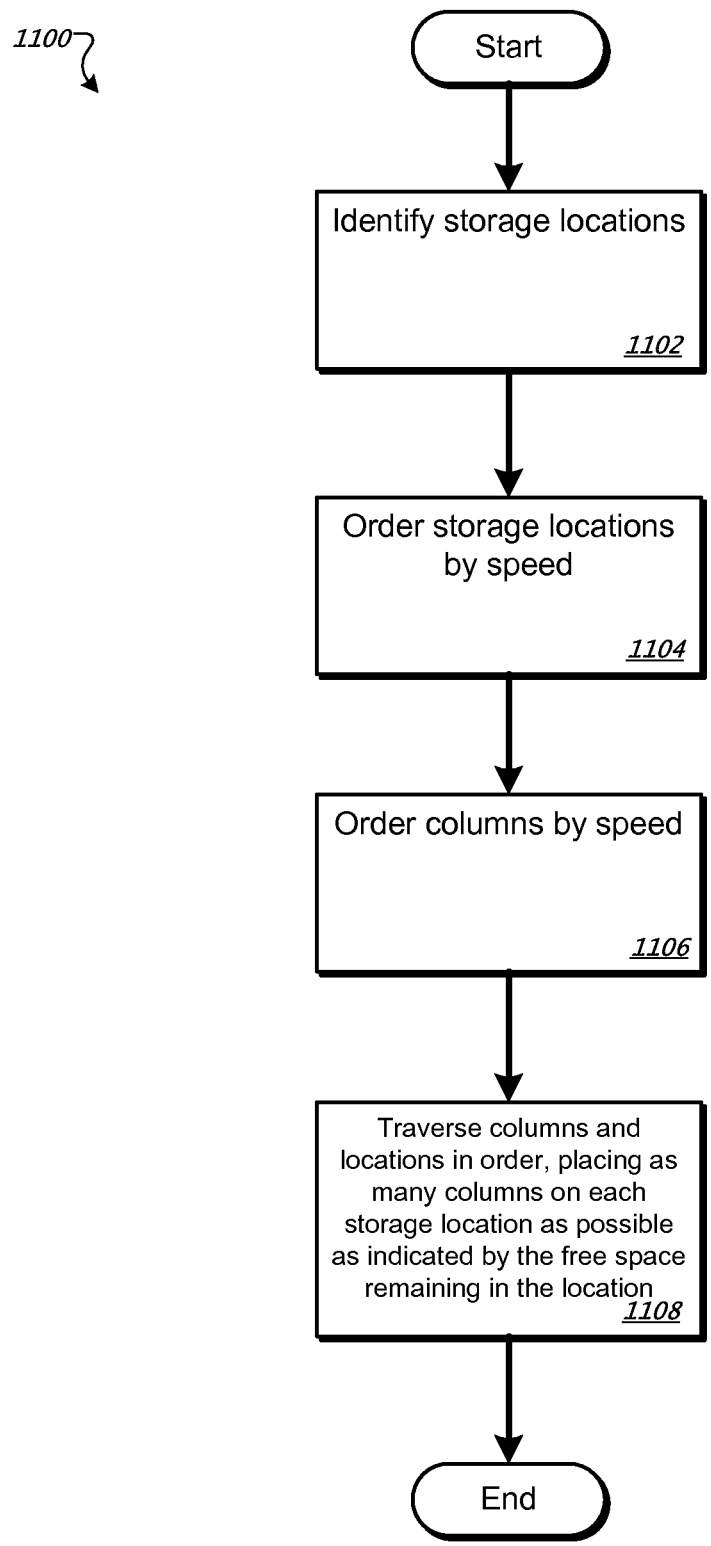
FIG. 11 is a flow chart of an example technique for assigning columns to storage.

FIG. 11 is a flow chart of an example technique for assigning columns to storage. Initially, a set of storage locations to be used is identified excluding locations that are not to be used for the DATA access pattern, or locations that do not match the speed setting of the projection or data partition. (step 1102). The set of locations are then ordered by speed—fastest first—using the calculated SPEED number, as described earlier (step 1104). In some implementations, if the set of columns is assigned to be stored in a grouped ROS format, the speed setting used can be the average of all the columns (for a conservative placement policy) or the fastest of all the columns (for an aggressive placement policy). The columns are ordered according to speed suggestions specified in the projection definition, most performance first (step 1106). In various implementations, the columns and locations are traversed in order, placing as many columns on each storage location as indicated by the free space remaining in the location (step 1108). Thus a disk with N % of the total free space will store ~N % of the column data, for example. In further implementations, the placement algorithm can be modified dynamically by collecting usage statistics on the column based on queries asked in the system. Also, the Tuple Mover can provide more accurate space usage statistics for the columns which can then be used to improve the efficacy of step 1106.

Tuple Mover

At any given time there may be multiple ROS containers on disk. A policy-driven Tuple Mover 212 places upper bounds on the number and sizes of ROS containers in the system and the resources consumed by the system's operations. The Tuple Mover is responsible for so-called move-out and merge-out operations. The move-out operation moves data out of the WOS to a new ROS container, determines the appropriate format for the ROS container (see FIG. 10 above), and converts the data from its WOS format to the ROS container's format as part of the operation. The Tuple Mover 212 determines when to perform the move-out operation based on trading off moving data out frequently (which would lead to many small ROS containers that will have to merged later) and moving data out infrequently (which could result in data loss if there is a system failure).

In various implementations, the Tuple Mover 212 performs the move-out operation periodically based on a configurable time period and moves WOS data to a ROS container if the data exceeds a certain configurable age or size threshold. The maximum age of the WOS data is configurable as a policy setting. If the WOS for any projection has data older than that suggested by the policy, for instance, the oldest WOS data will be scheduled for move-out. Once all WOS data have been moved based on age, additional WOS data can be selected for move-out if the total WOS size still exceeds the policy threshold. The move-out operation can run concurrently with the merge-out operation.

The merge-out operation merges two or more ROS containers to a new ROS container that has a format (grouped ROS or column) determined by the operation (see FIG. 10 above). In some implementations, an n-way merge-out corresponds to the number of ROS containers will be merged in a single merge-out operation. An n-way merge-out operation to merge n ROS containers can be implemented as a sequence of two-way merges but this may be less efficient because the data will be merged multiple times. Generally speaking, the number of ROS containers merged depends on how much memory is available for the merge-out operation, for example. The merge-out operation can be a resource intensive operation and can take a long time to complete. In general, managing the number and sizes of ROS containers in the system can be complex and can have an impact on query performance. In some implementations, there would be a small number of ROS containers such that the node 202 is kept busy by processing queries by accessing ROS containers rather than by merging them.

In various implementations, a policy for the merge-out operation satisfies one or more of the following goals:

Provide an upper bound on the number of ROS container files present in the system before the Tuple Mover takes action.

Provide an upper bound on an amount of resources that are engaged in merge operations.

Merge files of similar size, primarily for efficiency.

Attempt to limit the number of times a row of data will undergo the merge process, again for efficiency (e.g., minimize CPU and disk resources used per tuple).

Attempt to perform small merges quickly, as these are "low hanging fruit".

In different implementations, the parameters detailed in TABLE 4 below control the merge-out operation. Other parameters are possible, however.

TABLE 4

| PARAMETER | DESCRIPTION |
| --- | --- |
| Memory Budget | An amount of memory (e.g., random access memory) allocated for some task (e.g., a maximum number of ROS containers). |
| Maximum ROS Containers Per Projection ("MCP") | A maximum number of ROS containers that can be kept per projection; this is generally based on the memory budget. |
| ROS Container Size | The sum of file sizes for all files that constitute a ROS container. |
| Stratum | A category of ROS containers based on a ROS container size range. ROS containers are categorized into contiguous, non-overlapping strata based on their size. A stratum is defined by a (minimum size, maximum size) pair. See FIG. 12. |
| Stratum Height ("StratumHeight") | For a stratum, the quotient obtained by dividing the largest ROS container size defined in the stratum size range by the smallest ROS container size in the range. In some implementations, the same height is used for all strata; so that for stratum n >= 1 the maximum size is height * minimum size[n], or height * maximum size[n − 1], for instance. |
| Maximum ROS Container Size | The largest ROS container size one would ever expect to see. By way of illustration, an obvious maximum is the total size of all disk volumes, which is likely smaller than a logical max of $2^{64}$ bytes per column. |
| Negligible ROS Container Size | A lower limit of a ROS container's size, where the cost of opening the ROS container's files (which involves disk seeks and so on) approximates the cost of scanning the ROS containers. In such cases, there is very little advantage to merging the ROS container with ROS containers of similar size, as long as the other ROS containers are also negligible.<br>In some implementations, the range of sizes for stratum 0 is from a minimum of 1 byte to a maximum of the negligible ROS container size (provided that there is enough space to use the strata algorithm at all). In further implementations, the negligible ROS size is 1 MB per column. |
| Number of Strata ("StratumCount") | The number of strata in the categorization scheme, including stratum 0. See FIG. 12. |
| Maximum ROS containers per Stratum ("MCS") | The number of ROS containers present in a stratum before the Tuple Mover 212 will attempt to merge the ROS containers in the stratum. See FIG. 12. |

Figure 12:
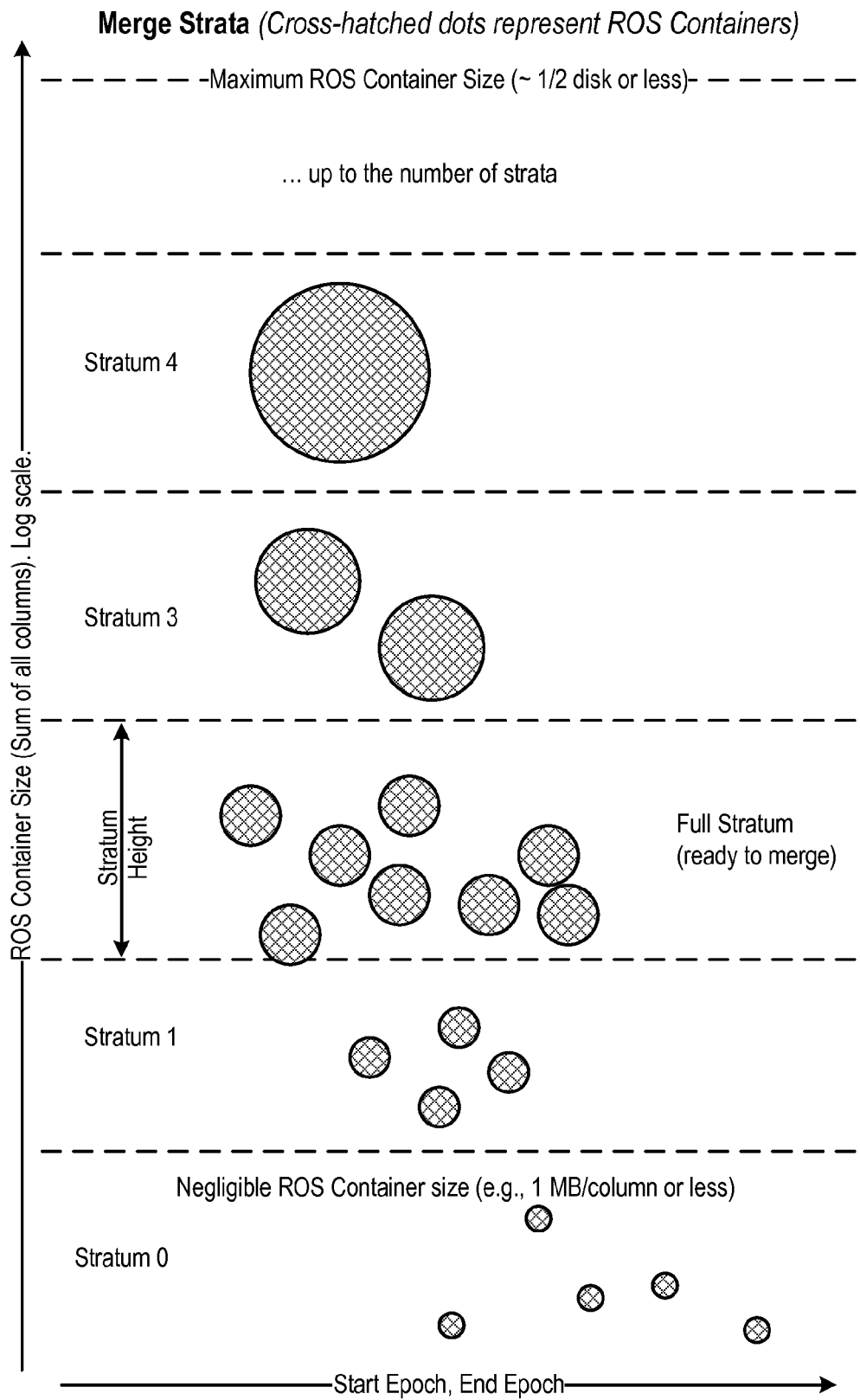
FIG. 12 illustrates example merge strata for a merge-out operation.

The merge-out operation categorizes ROS containers into "strata" based on their size, as shown FIG. 12. Generally speaking, the merge-out operation determines, for a given projection, which set of ROS containers to merge. To assess a projection for merge-out, the Tuple Mover 212 determines the strata for the projection and the MCS. If any stratum has the MCS (or more), a merge-out operation will be indicated. In some implementations, the merge-out operation will be for the smallest stratum that is eligible, and will operate on the ROS containers with the smallest start epochs (using end epoch and size to break ties) until there are no more than MCS containers.

Figure 13A:
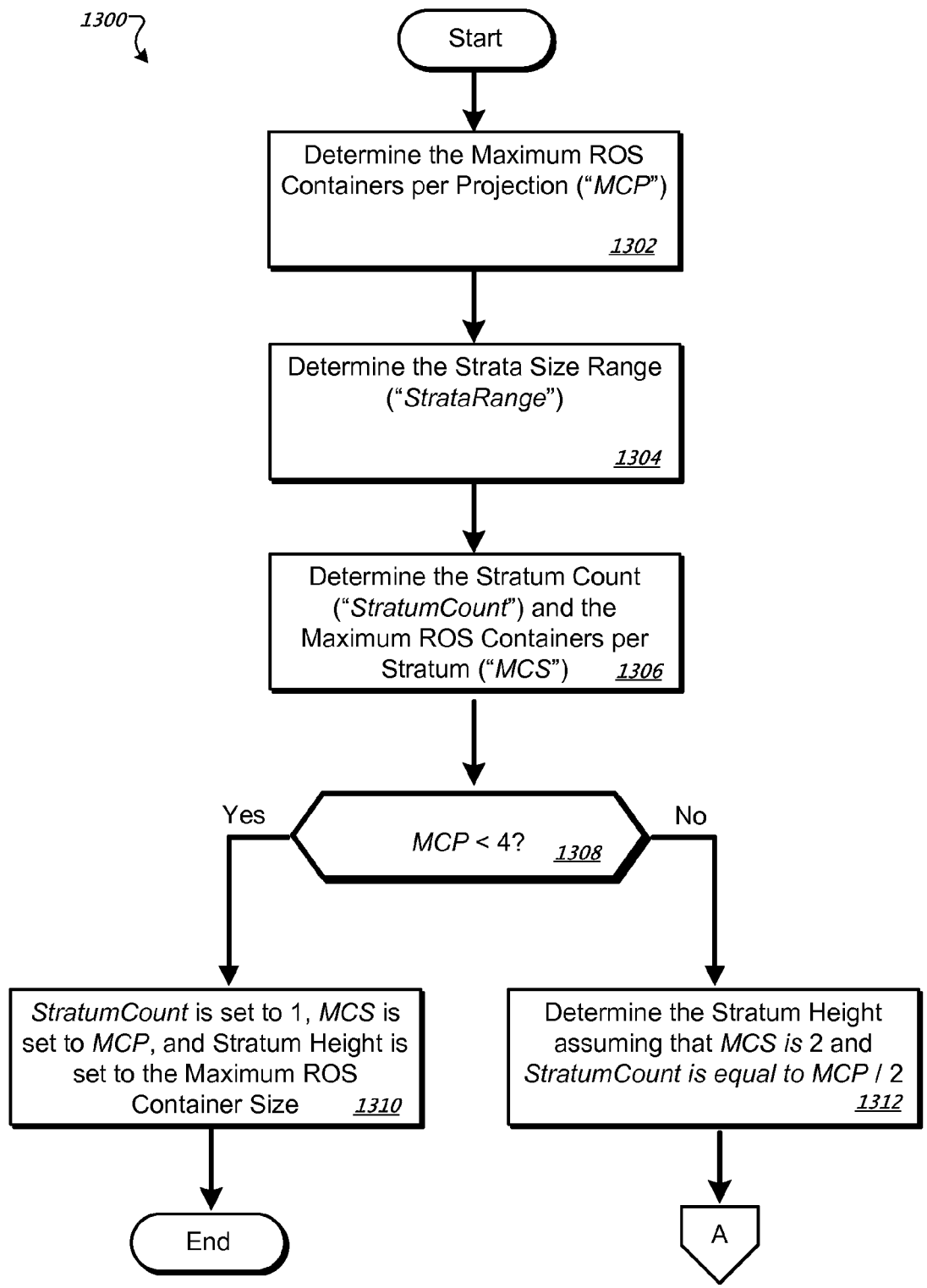
FIGS. 13A-B illustrate an example technique for determining the strata for a projection.
Figure 13B:
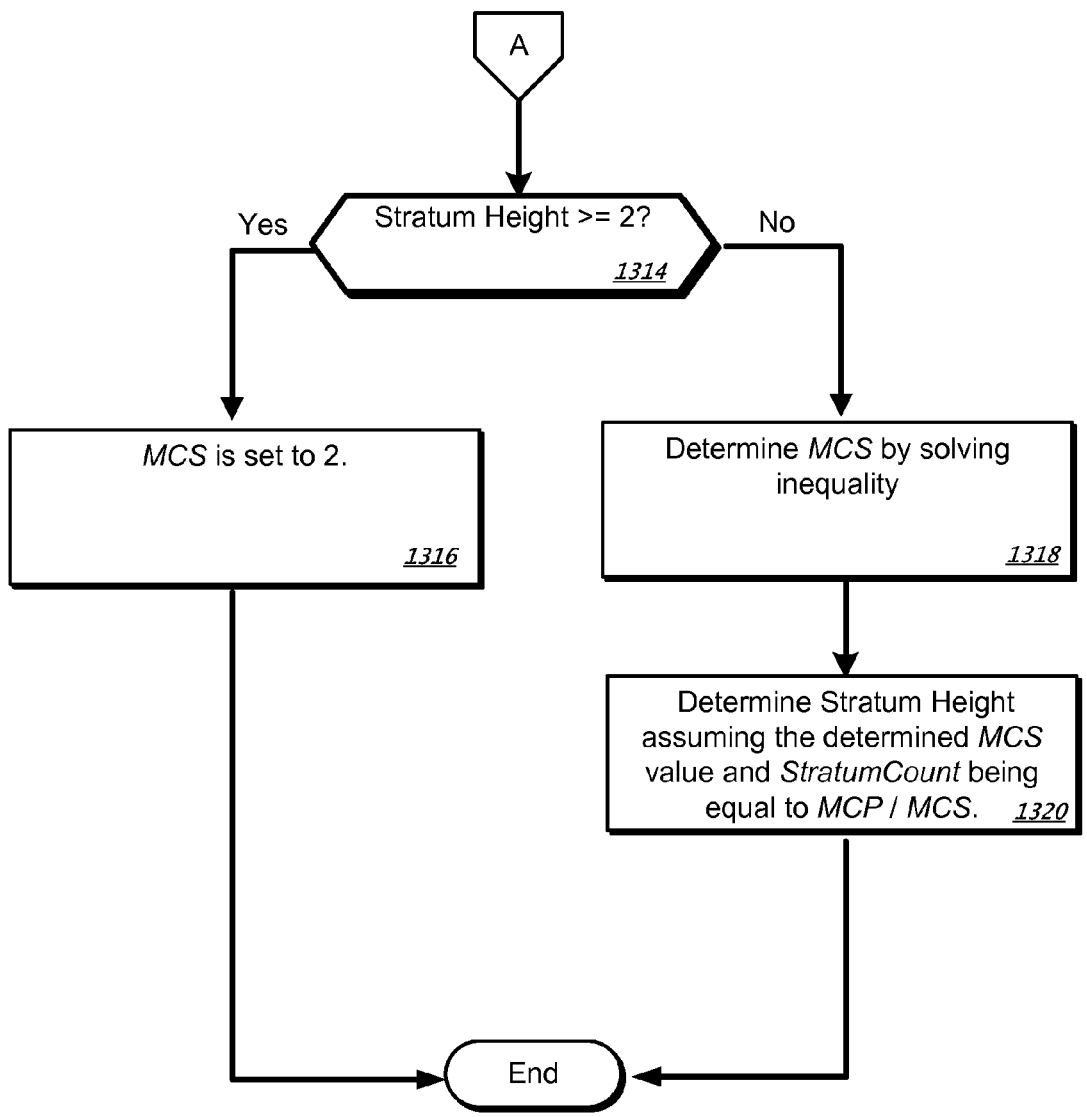

FIGS. 13A-B illustrate an example technique 1300 for determining the strata for a projection. In step 1302, the memory budget from TABLE 4 is used to compute the MCP. In some implementations, the space per ROS container is the number columns in the projection ("CIP")×2 megabytes. Other ways of calculating the space per ROS container are possible. In further implementations, the number of projection columns includes a hidden internal epoch column. The epoch is a system-maintained "clock" that advances automatically at regular intervals, e.g., 5 minutes. Each transaction is stamped with the current epoch when the transaction commits. All transactions that commit within the same epoch will have all inserted data rows with that epoch value for the epoch column. Similarly, when data is deleted, the current epoch is recorded with the positions in the delete vectors. This is used to retrieve results as of a time in the past (e.g., historical queries). By way of illustration, a user can query the RDBM for results as they were at 10 AM or epoch 55.

In yet further implementations, space may be set aside for one or more so-called delete vector files. In these implementations data is not deleted immediately when a SQL DELETE statement is executed. Instead, deletes are implemented by storing the list of positions (rows) within the ROS container that are deleted—the data structure which stores these deleted positions is referred to as a delete vector. Each ROS container may been associated with one or more delete vectors that represent deleted positions within that container. The Tuple Mover 212 will remove the deleted records when it rewrites the ROS container as part of its merge-out operation.

The MCP is defined in some implementations as, for example:

$$MCP = \frac{MemoryBudget}{CIP \times 2MB + DeleteVectorSpace}$$

If MCP is less than two, then MCP is set to 2.

In step 1304, the strata range ("StrataRange") is determined as MRS/NRS. In some implementations, the NRS is computed as 1 megabyte times the number of projection columns. Other ways of determining the NRS are possible. In some implementations, the MRS is computed as half of the total disk space in data storage locations associated with the RDBMS. Other ways of determining the MRS are possible.

In step 1306, the number of stratums ("StratumCount") and the MCS are determined. If the MCP as determined above is <4 (step 1308), the StratumCount is set to 1, the MCS is set to the MCP and the StratumHeight is set to the MRS (step 1310) and the technique completes. Otherwise, the StratumHeight is determined assuming that the MCS is 2 and that the Stratum Count is equal to MCP/2 (step 1312). In various implementations, the StratumHeight is determined using the following formula since all strata have the same height:

$$StratumHeight^{StratumCount-1} = StrataRange$$

Use of StratumCount−1 is because one stratum is for the negligibly-sized ROS containers (see FIG. 12). This can be rewritten as:

$$StrataHeight = {}^{StratumCount-1}\sqrt{StrataRange}$$

If StrataHeight is greater or equal to 2 (step 1314), then two-way merges are the best way to merge items of approximately equal size. Therefore, in step 1316 MCS is set to 2.

If StrataHeight is less then 2 (step 1314), then it is possible that more than two ROS containers can be used per stratum. In step 1318, a maximum value for the MCS is determined where the following inequality holds:

$$(0.9 \times MCS)^{\left(\frac{MCP}{MCS}-1\right)} \geq StrataRange$$

(Here, the 0.9 expresses the possibility that the resulting ROS container may be slightly smaller than the sum of the ROS containers being merged. Other constants are possible.) This inequality can be solved using iteration, for example, starting with MCS=2 and working up until the inequality is broken. Other ways of solving the inequality are possible. In step 1320, StrataHeight is determined assuming the value of MCS determined in step 1318 and assuming StrataCount is equal to MCP/MCS.

Embodiments of the subject matter and the functional operations described in this specification can be implemented in digital electronic circuitry, or in executing computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be one or more machine-readable storage devices, machine-readable storage substrates, memory devices, compositions of matter, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the implementation or of what may be claimed, but rather as descriptions of features specific to particular embodiments of the implementation. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the implementation have been described. Other embodiments are within the scope of the following claims. For example, the actions recited in the claims can be performed in a different order and still achieve desirable results.

What is claimed is:

1. A computer-implemented method comprising:
   determining a size of projection data to be stored in a read-optimized store (ROS) container, wherein the projection data includes rows and columns of data;
   determining whether the size of the projection data is greater than a predetermined threshold;
   in response to a determination that the size of the projection data is greater than the predetermined threshold, storing the projection data in the ROS container in a column format, wherein, in the column format, each column of the projection data is stored in a separate file; and
   in response to a determination that the size of the projection data is less than the predetermined threshold, storing the projection data in the ROS container in a grouped ROS format, wherein, in the grouped ROS format, each of a plurality of blocks formed of respective groups of rows and columns of the projection data is stored in a separate file
   wherein storing the projection data in the grouped ROS format includes:
     selecting a plurality of columns of the projection data, and
     storing rows of the selected columns as blocks of data in the ROS container until all of the rows of the selected columns are stored in the ROS container.

2. The method of claim 1, wherein the projection data is stored persistently.

3. The method of claim 1, wherein the projection data is to be stored in the ROS container when the projection data exceeds an age or an aggregate size.

4. The method of claim 1, further comprising updating the projection data in a write-optimized store before storing the projection data in the ROS container.

5. The method of claim 1, further including selecting an order of the columns in the selected subset of columns to be stored together.

6. The method of claim 5 in which each row's first columns are stored together in a single file with at least one other row's first columns.

7. The method of claim 1, wherein storing the projection data in the column format comprises:
  selecting one column of the projection data,
  storing a subset of rows of data of the selected column as a block of data in the ROS container, and
  storing additional subsets of rows of data of the selected column as additional blocks of data in the ROS container until all of the rows of data of the selected column are stored in the ROS container.

8. The method of claim 7, wherein the blocks of data of the selected column are stored in separate files.

9. The method of claim 1, further comprising storing rows of the projection data for columns in the grouped ROS format based on a frequency of use of the columns of the rows.

10. The method of claim 1, further comprising updating the projection data in response to a request to write data to the projection.

11. The method of claim 10, wherein the updating is performed in response to processing a database operator to write data to storage.

12. A computer-implemented method comprising:
  selecting at least two different storage formats to store data of a database projection based on patterns of updating data of the projection, wherein the at least two different storage formats include a column format and a grouped read-optimized store (ROS) format, wherein the column format is to store each column of the data in a separate file, and the grouped ROS format is to store each of a plurality of blocks formed of respective groups of rows and columns of the data is stored in a separate file;
  updating the projection data based on the patterns using the selected storage formats;
  determining whether a size of the updated projection data is greater than a predetermined threshold;
  in response to a determination that the size of the updated projection data is greater than the predetermined threshold, storing the updated projection data in the column format; and
  in response to a determination that the size of the updated projection data is less than the predetermined threshold, storing the updated projection data in the grouped ROS format,
  wherein storing the updated projection data in the grouped ROS format includes:
    selecting columns of the updated projection data to be stored together, and
    storing rows of the selected columns as blocks of data in the store until all of the rows of the selected columns are stored in the store.

13. The method of claim 12, wherein the storage formats further comprise a write-optimized storage format.

14. The method of claim 12, further comprising storing the updated projection data persistently.

15. The method of claim 12, wherein the projection data is stored at a time based on at least one of an age or an aggregate size of the of the projection data.

16. The method of claim 12, further comprising storing the updated projection data in a write-optimized store.

17. The method of claim 12, further comprising:
  determining the size of the updated projection data by estimating a storage size of rows of the updated projection data based on a size of previously stored projection rows; and
  storing the rows of the updated projection data in the grouped read-optimized store (ROS) format or in the column format based on the estimated storage size.

18. The method of claim 12, wherein each of the blocks of data is stored in a single file.

19. The method of claim 12, wherein storing the updated projection data in the column format includes:
  selecting one column of the updated projection data,
  storing a plurality of rows of the selected column in a file, and
  storing additional rows of the selected column in the file until all of the rows of the selected column are stored in the file.

20. The method of claim 12, further comprising storing rows of the updated projection data in the grouped read-optimized store (ROS) format based on a frequency of use of columns of the rows.

21. The method of claim 12 wherein updating is performed in response to processing a database operator to write data to storage.

22. A non-transitory computer readable medium on which is stored a set of instructions that, when executed, causes a device to:
  determine a size of projection data to be stored in a read-optimized store (ROS) container, wherein the projection data includes rows and columns of data;
  determine whether the size of the projection data is greater than a predetermined threshold;
  in response to a determination that the size of the projection data is greater than the predetermined threshold, store the projection data in the ROS container in a column format, wherein, in the column format, each column of the projection data is stored in a separate file; and
  in response to a determination that the size of the projection data is less than the predetermined threshold, store the projection data in the ROS container in the grouped ROS format, wherein, in the grouped ROS format, each block of rows and columns of the projection data is stored in a separate file,
  wherein to store the projection data in the grouped ROS format, the set of instructions is to cause the device to:
    select a plurality of columns of the projection data, and
    store rows of the selected columns as blocks of data in the ROS container until all of the rows of the selected columns are stored in the ROS container.

23. A computer-implemented method comprising:
  selecting a plurality of candidate containers to store projection data;
  identifying a plurality of containers to merge in the candidate containers;
  selecting storage formats to store the projection data, including:
    determining whether a size of the projection data is greater than a predetermined threshold;
    in response to a determination that the size of the projection data is greater than the predetermined threshold, selecting a column format to store the projection data, wherein, in the column format, each column of the projection data is stored in a separate file; and
    in response to a determination that the size of the new rows is less than the predetermined threshold, selecting a grouped read-optimized store (ROS) format to store the projection data, wherein, in the grouped ROS format, each of a plurality of blocks formed of respective groups of rows and columns of the projection data is stored in a separate file; and
  merging the identified containers into a new container according to the selected storage formats, wherein selecting the storage formats is based on an assessment of existing storage allocated to the projection data such that some but not all of projection data is stored in the grouped ROS format, wherein selecting the grouped ROS format to store the projection data includes:
- selecting a plurality of columns of the projection data to be stored together, and
- storing rows of the selected columns as blocks of data in the store until all of the rows of the selected columns are stored in the store.

24. The method of claim 23 wherein the selected candidate containers are in a common size range.

25. The method of claim 23 wherein the identified containers are each associated with a start epoch that is smaller than the remaining candidate containers.

* * * * *

UNITED STATES PATENT AND TRADEMARK OFFICE
CERTIFICATE OF CORRECTION

PATENT NO. : 8,700,674 B2  
APPLICATION NO. : 12/502890  
DATED : April 15, 2014  
INVENTOR(S) : Chuck Bear et al.

Page 1 of 1

It is certified that error appears in the above-identified patent and that said Letters Patent is hereby corrected as shown below:

In the Specification

Column 21, lines 61-62, delete " $StratumHeight^{StratumCount-1} = StrataRange$ " and insert -- $StrataHeight = \sqrt[StratumCount-1]{StrataRange}$ --, therefor.

In the Claims

Column 25, line 57, in Claim 15, after "size" delete "of the".

Signed and Sealed this
Fourteenth Day of October, 2014

Michelle K. Lee
*Deputy Director of the United States Patent and Trademark Office*